United States Patent
Delaporte et al.

(10) Patent No.: US 9,235,561 B2
(45) Date of Patent: Jan. 12, 2016

(54) CONTEXTUAL REPORT ELEMENT MAPPING TO WEB SERVICE INPUT PARAMETER

(75) Inventors: Fabrice Delaporte, Courbevoie (FR); Christophe Pennequin, Levallois-Perret (FR); Didier Bolf, Boulogne-Billancourt (FR); Alexis Naibo, Levallois-Perret (FR); Ali Meziani, Paris (FR)

(73) Assignee: Business Objects S.A., Levallois-Perret (FR)

(*) Notice: Subject to any disclaimer, the term of this patent is extended or adjusted under 35 U.S.C. 154(b) by 1129 days.

(21) Appl. No.: 12/253,482

(22) Filed: Oct. 17, 2008

(65) Prior Publication Data

US 2010/0100802 A1    Apr. 22, 2010

(51) Int. Cl.
G06F 17/20 (2006.01)
G06F 17/24 (2006.01)
G06F 17/30 (2006.01)

(52) U.S. Cl.
CPC ........ *G06F 17/248* (2013.01); *G06F 17/30126* (2013.01)

(58) Field of Classification Search
CPC . G06F 17/20; G06F 17/30126; G06F 17/202; G06F 17/248
USPC .................................................. 715/212, 217
See application file for complete search history.

(56) References Cited

U.S. PATENT DOCUMENTS

| | | | |
|---|---|---|---|
| 7,302,444 B1* | 11/2007 | Dunmore et al. | 1/1 |
| 7,747,782 B2* | 6/2010 | Hunt et al. | 709/246 |
| 2007/0011177 A1* | 1/2007 | Sol et al. | 707/100 |
| 2007/0203915 A1* | 8/2007 | McCully | 707/10 |
| 2007/0294631 A1* | 12/2007 | Wiseman | 715/764 |
| 2008/0033876 A1* | 2/2008 | Goldman et al. | 705/42 |
| 2008/0082495 A1 | 4/2008 | Polo-Malouvier et al. | |
| 2008/0109235 A1 | 5/2008 | Binnie et al. | |

* cited by examiner

*Primary Examiner* — Cesar Paula
*Assistant Examiner* — Mohammed-Ibrahim Zuberi
(74) *Attorney, Agent, or Firm* — Buckley, Maschoff & Talwalkar LLC

(57) ABSTRACT

Some aspects include selection of a cell of a report section, the cell associated with a data dimension and with a context of the report section, and association of the cell with an input parameter of a software service. Aspects may include identification of a contextual report specification associated with a software service and with one or more report elements, at least one of the one or more report elements being associated with an input parameter of the software service, determination of data corresponding to a plurality of the one or more report elements, generation of a script to invoke the software service and to pass contents of the at least one of the one or more report elements as the input parameter to the software service, and generation of a report output based on the data and the script.

16 Claims, 29 Drawing Sheets

```
<s:complexType name="parameters">
    <s:sequence>
        <s:element name="Year" type="s:string">
            <s:annotation>
                <s:documentation/>
            </s:annotation>
        </s:element>
        <s:element name="ServiceRevenuesByCountry" maxOccurs="unbounded">
            <s:annotation>
                <s:documentation/>
            </s:annotation>
            <s:complexType>
                <s:sequence>
                    <s:element name="Country" type="s:string">
                        <s:annotation>
                            <s:documentation/>
                        </s:annotation>
                    </s:element>
                    <s:element name="RevenueByService" maxOccurs="unbounded">
                        <s:annotation>
                            <s:documentation/>
                        </s:annotation>
                        <s:complexType>
                            <s:sequence>
                                <s:element name="Service" type="s:string">
                                    <s:annotation>
                                        <s:documentation/>
                                    </s:annotation>
                                </s:element>
                                <s:element name="Revenue" type="s:double">
                                    <s:annotation>
                                        <s:documentation/>
                                    </s:annotation>
                                </s:element>
                            </s:sequence>
                        </s:complexType>
                    </s:element>
                </s:sequence>
            </s:complexType>
        </s:element>
    </s:sequence>
</s:complexType>
```

FIG. 26

```xml
<parameters>
        <Year>FY1998</Year>
        <ServiceRevenuesByCountry>
                <Country>France</Country>
                <RevenueByService>
                        <Service>Activities</Service>
                        <Revenue>4200</Revenue>
                </RevenueByService>
                <RevenueByService>
                        <Service>Bungalow</Service>
                        <Revenue>43800</Revenue>
                <RevenueByService>
                        <Service>Excursion</Service>
                        <Revenue>40950</Revenue>
                </RevenueByService>
                <...>
        </ServiceRevenuesByCountry>
        <ServiceRevenuesByCountry>
                <Country>US</Country>
                <RevenueByService>
                        <Service>Activities</Service>
                        <Revenue>55000</Revenue>
                </RevenueByService>
                <RevenueByService>
                        <Service>Bungalow</Service>
                        <Revenue>103225</Revenue>
                <RevenueByService>
                        <Service>Excursion</Service>
                        <Revenue>41400</Revenue>
                </RevenueByService>
                <...>
        </ServiceRevenuesByCountry>
</parameters>
<parameters>
        <Year>FY1999</Year>
        <...>
</parameters>
```

CONTEXTUAL REPORT ELEMENT MAPPING TO WEB SERVICE INPUT PARAMETER

BACKGROUND

Conventional enterprise software systems receive, generate and store data related to many aspects of a business enterprise. In some implementations, this data may relate to marketing, sales, customer relations, supplier relations, inventory, human resources, and/or finances. Reporting tools are commonly used to collect and present enterprise data in a coherent manner. Reporting tools may therefore facilitate and improve business enterprise decision-making.

Reporting tools typically allow a user to create a report specification. A report specification defines the layout of report elements (e.g., sections, tables, columns, rows, header, footer, etc.) and the data which is to populate the report elements. When a report is requested, the tools generate a populated report based on stored enterprise data and the report specification. If the relevant data changes, a subsequently-generated report will include the changed data.

For most users, the reporting interface is the primary, if not exclusive, interface to the stored enterprise data. It would be beneficial to leverage this well-known and well-used reporting metaphor to provide mechanisms for modifying the stored enterprise data.

BRIEF DESCRIPTION OF THE DRAWINGS

FIGS. 6 through 23 comprise outward views of a user interface according to some embodiments.

FIG. 25 comprises an outward view of a user interface according to some embodiments.

FIG. 26 comprises a service interface according to some embodiments.

FIG. 27 comprises service parameters generated according to some embodiments.

FIGS. 28 and 29 comprise outward views of a user interface according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
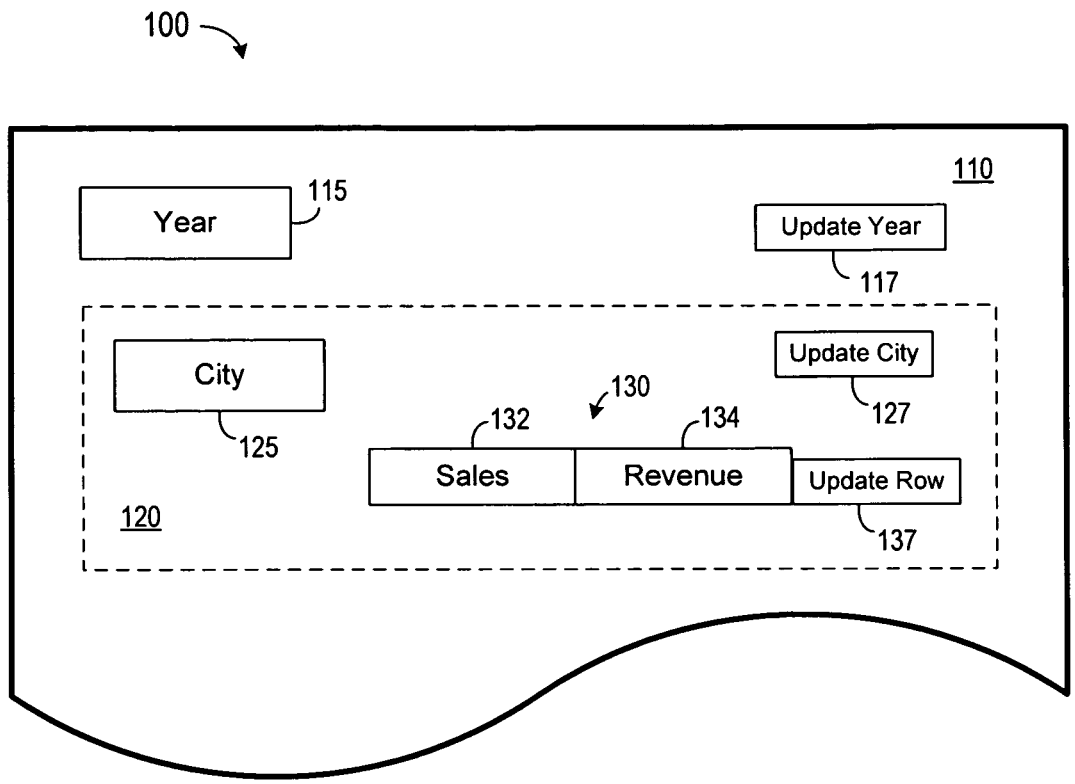
FIG. 1 is a generic block diagram of a report according to some embodiments.

FIG. 1 is a block diagram of report template 100 for explaining the concept of "context" according to some embodiments. Generally, the context associated with a report element refers to the dimension of a section (or subsection) based on which the data of the element is driven. Embodiments are not strictly limited to this characterization of context.

Report 100 includes sections 110 and 120. Section 110 includes cell 115 associated with a "Year" dimension, and section 120 includes cell 125 associated with a "City" dimension. Section 120 is nested within section 110. Accordingly, the "Year" dimension is the context of cell 125.

Section 120 includes table 130, which in turn includes column 132 and column 134. Table 130 is nested within section 120 and within section 110. Accordingly, the context of table 130 (and of columns 132 and 134) includes the "Year" dimension of section 110 and the "City" dimension of section 120.

Each illustrated element of report template 100 can generally be referred to as a contextual report element because the data which is to populate each element is dependent upon the context(s) associated with each element. Some embodiments may employ other report elements that are or will be known in the art. Contextual report elements are not limited to the types and arrangements shown in FIG. 1.

Report template 100 also includes submission controls 117, 127 and 137. Submission control 117 is associated with the context of section 110, submission control 127 is associated with the context of section 120, and submission control 137 is associated with the context of table 130. According to some embodiments, each of submission controls 117, 127 and 137 is associated with a service. The service may be provided by any service-oriented architecture to allow writing to or otherwise updating of a data structure.

Input parameters Sales, City and Year of the service may be associated, respectively, with column 132, cell 125, and cell 115. However, due to the different contexts in which submission controls 117, 127 and 137 reside, data passed to the service in response to selection of one of submission controls 117, 127 and 137 will be different from data passed to the service in response to selection of another one of submission controls 117, 127 and 137.

Figure 2:
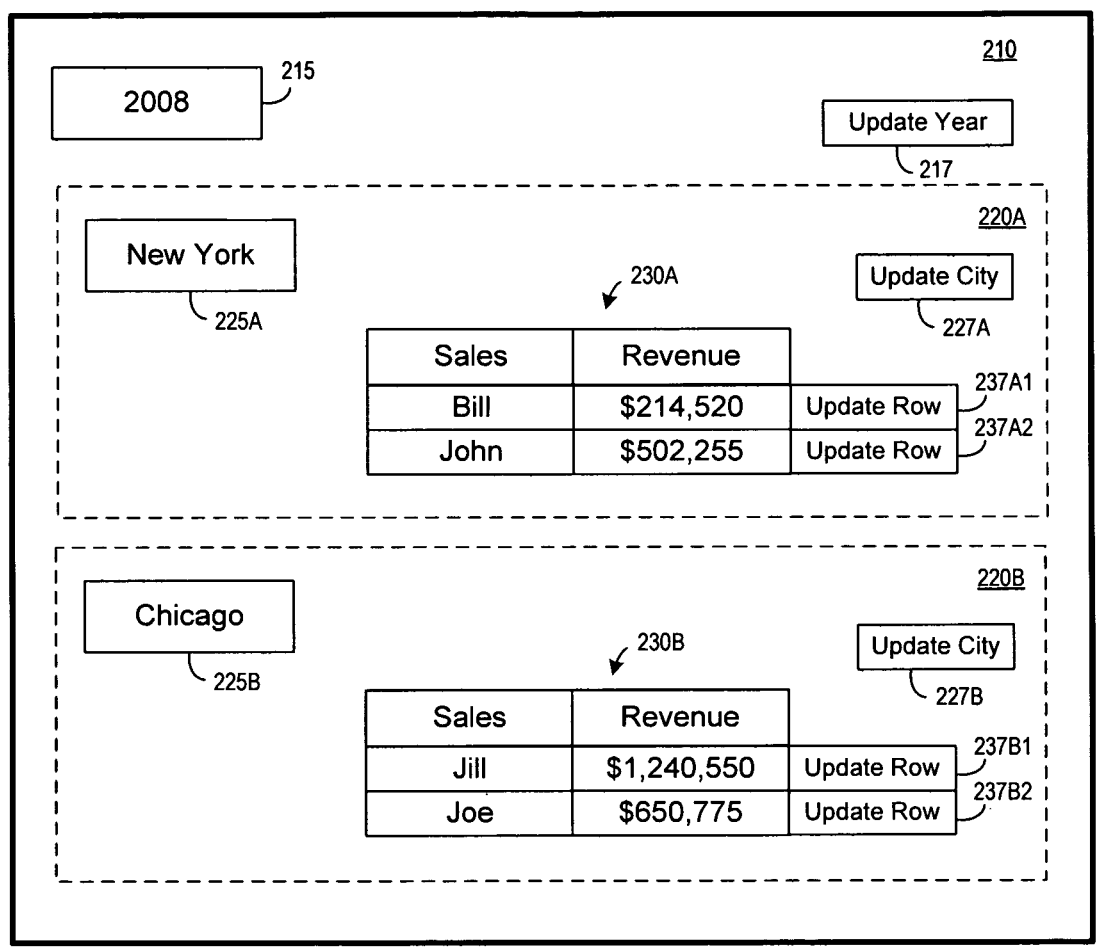
FIG. 2 is a view of a report according to some embodiments.

FIG. 2 is a view of report 210 that may be generated based on report template 100 according to some embodiments. As shown, the data populating each report element is driven based on the context of the report element. Report 210 may be generated using known reporting tools.

Cells 225A and 225B are populated with data that is associated with a "City" dimension and with the year 2008 of cell 215. Similarly, the columns of tables 230A and 230B are populated with data associated with the cities specified in respective cells 225A and 225B, and with the year 2008 of cell 215. Specifically, table 230A includes Sales, Revenue data for New York in 2008, and table 230B includes Sales, Revenue data for Chicago in 2008. The data may be populated upon generation of report 200 and/or by a user who has input the data into one or more fields.

Report 210 includes submission controls 217, 227A, 227B, 237A1, 237A2, 237B1 and 237B2 associated with similarly-numbered ones of submission controls 117, 127 and 137. As described above, each submission control is associated with a same service and various report elements of report 210 are associated with respective input parameters (i.e., Sales, City and Year) of the service. As also described above, the specific data passed to the service upon selection of one of submission controls 217, 227A, 227B, 237A1, 237A2, 237B1 and 237B2 depends on the context in which the selected control resides.

For example, selection of any one of submission controls 237A1, 237A2, 237B1 and 237B2 invokes the associated service and passes the associated year (2008), the one associated city (New York or Chicago) and the one associated salesperson (Bill, John, Jill or Joe) as input parameters to the service. In contrast, selection of submission controls 227A invokes the service with the associated year (2008), the associated city (New York) and all associated sales (Bill, John) as input parameters. Lastly, selection of submission control 217 invokes the associated service and passes the associated year (2008), all cities (New York and Chicago) and all sales per city as input parameters to the service. Of course, it is assumed that the service is capable of accepting simple or list parameters as described in the above example.

Figure 3:
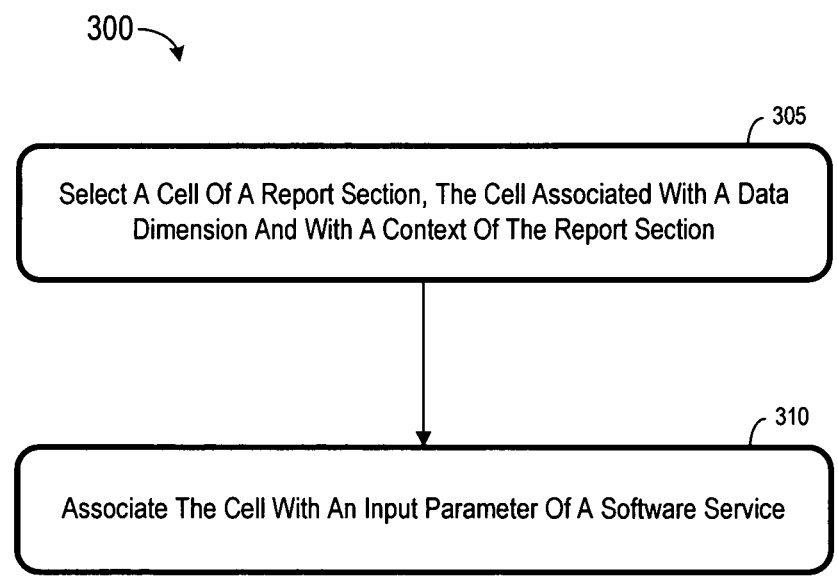
FIG. 3 is a flow diagram of a process according to some embodiments.

FIG. 3 is a flow diagram of process 300 according to some embodiments. Process 300 may be executed by hardware and embodied in program code stored on a tangible computer-readable medium.

Initially, at 305, a cell of a report section is selected. The cell is associated with a data dimension and with a context of the report section. Some embodiments of 305 may comprise selecting any contextual report element (e.g., a row, a column, a table, etc.) consisting of one or more cells.

Implementation details of 305 according to some specific embodiments are described below. With reference to FIG. 1, however, table 130 may be selected at 305. As noted above, each cell of table 130 is associated with a data dimension (i.e., "Sales" and "Revenue") and with a context (i.e., "Year", "City").

Next, at 310, the selected cell is associated with an input parameter of a software service. Such a software service may include a Web Service, an Application Programming Interface, a Software Development Kit, or any other type of callable software service that is or becomes known. By associating the selected cell with the input parameter, the reporting metaphor may be expanded to provide input to a back-end system.

Figure 4:
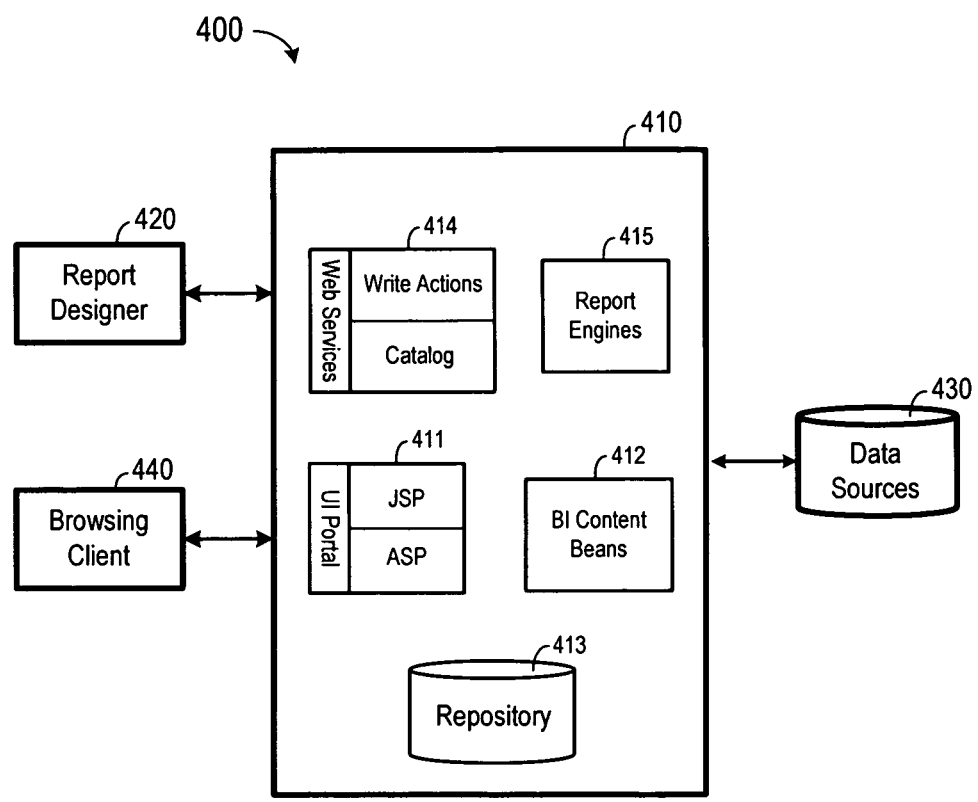
FIG. 4 is a block diagram of a system according to some embodiments.

FIG. 4 is a generic block diagram of architecture 400 according to some embodiments. Architecture 400 may implement process 300 of FIG. 3, but embodiments are not limited thereto. Architecture 400 may comprise any suitable combination of hardware and software that is or becomes known. Architecture 400 includes Business Intelligence (BI) tier 410, report designer 420 and browsing client 440 of a client tier, and data sources 430 representing an enterprise systems tier.

BI tier 410 includes user interface (UI) portal 411 and BI content beans 412. Repository 413 stores objects (e.g., dimensions, measures, details) used by BI tier 410, report specifications, and report-specific named service instances as will be described below. Web Services 414 include write actions for writing to data sources 430 and a catalog specifying input parameters and other information regarding the write actions. Services used on conjunction with some embodiments are not limited to write actions or to Web services. For example, a service may comprise a call for updating ERP or other data source. BI tier 410 also includes report engines 415 to generate reports based on a corresponding report specification stored in repository 413 and on data of data sources 430 specified by the report specification.

Data sources 430 may comprise one or more of relational database, enterprise applications, legacy applications, Online Analytical Processing (OLAP) sources and other data sources. In this regard, BI tier 410 also includes any necessary connectors for interacting with one or more of data sources 430.

BI tier 410 may provide report designer 420 with functionality to generate reports according to some embodiments. Such reports include at least one contextual report element that is mapped to an input parameter of a software service. Report designer 420 may access UI portal 411, BI content beans 412, and the catalog of Web Services 414 to create and modify report specifications according to some embodiments.

Report designer 420 may comprise any suitable device, such as a desktop computer, a laptop computer, a personal digital assistant, a tablet PC, and a smartphone. Report designer 420 may execute program code of a rich client application, an applet in a Web browser, or any other application to perform the processes attributed thereto herein.

Browsing client 440 may also comprise any suitable device executing program code of a rich client application, an applet in a Web browser, or any other application. Browsing client 440 may access UI portal 411 and BI content beans 412 to view and interact with reports according to some embodiments. Once browsing client 440 requests a report, report engines 415 generate the report based on a corresponding report specification stored in repository 413 and on data of data sources 430 specified by the report specification.

Architecture 400 may include other unshown components to provide functionality other than that described herein. For example, BI tier 410 may include components to provide security, session management, and report delivery services (e.g., scheduling, publishing, dashboards).

Figure 5:
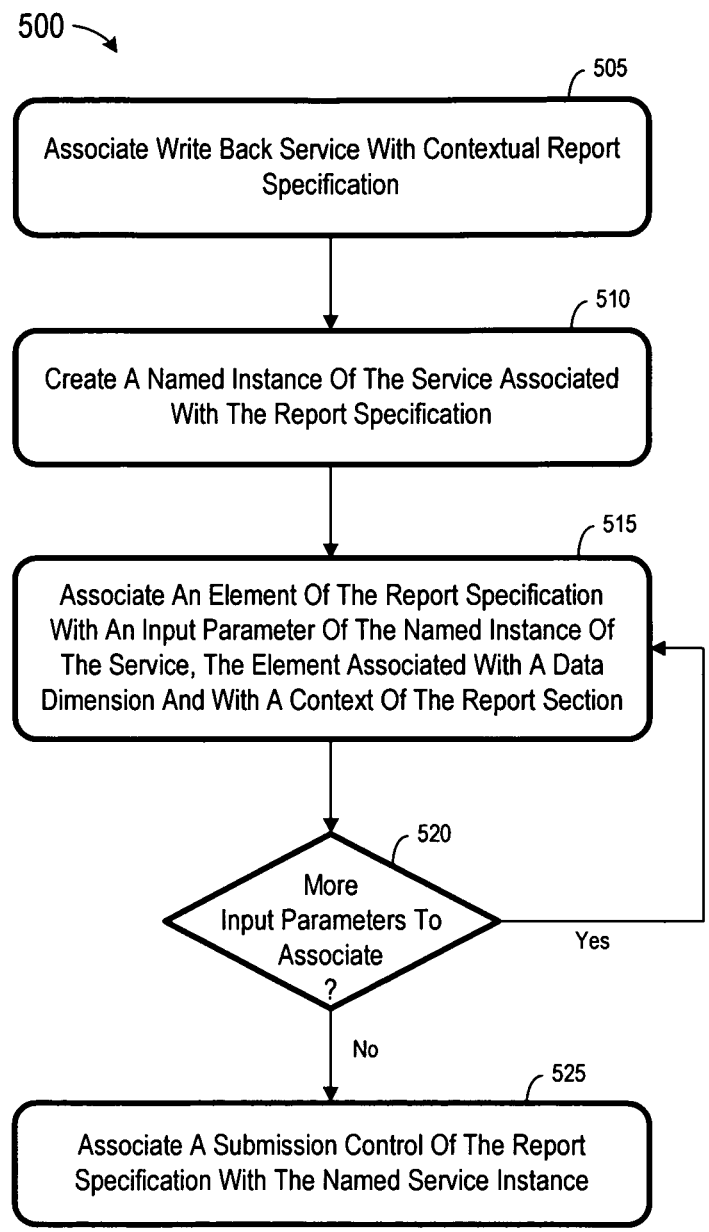
FIG. 5 is a flow diagram of a process according to some embodiments.

FIG. 5 is a flow diagram of process 500 according to some embodiments. Process 500 may be executed by hardware and/or embodied in program code stored on a tangible computer-readable medium. Process 500 may comprise an implementation of process 300, but embodiments are not limited thereto. Process 500 will be described below as if executed by elements of architecture 400 but, again, embodiments are not limited thereto.

FIGS. 6 through 12 illustrate the creation of contextual report elements that may be used during process 500. FIGS. 6 through 12 will therefore be described below prior to describing process 500.

Figure 6:
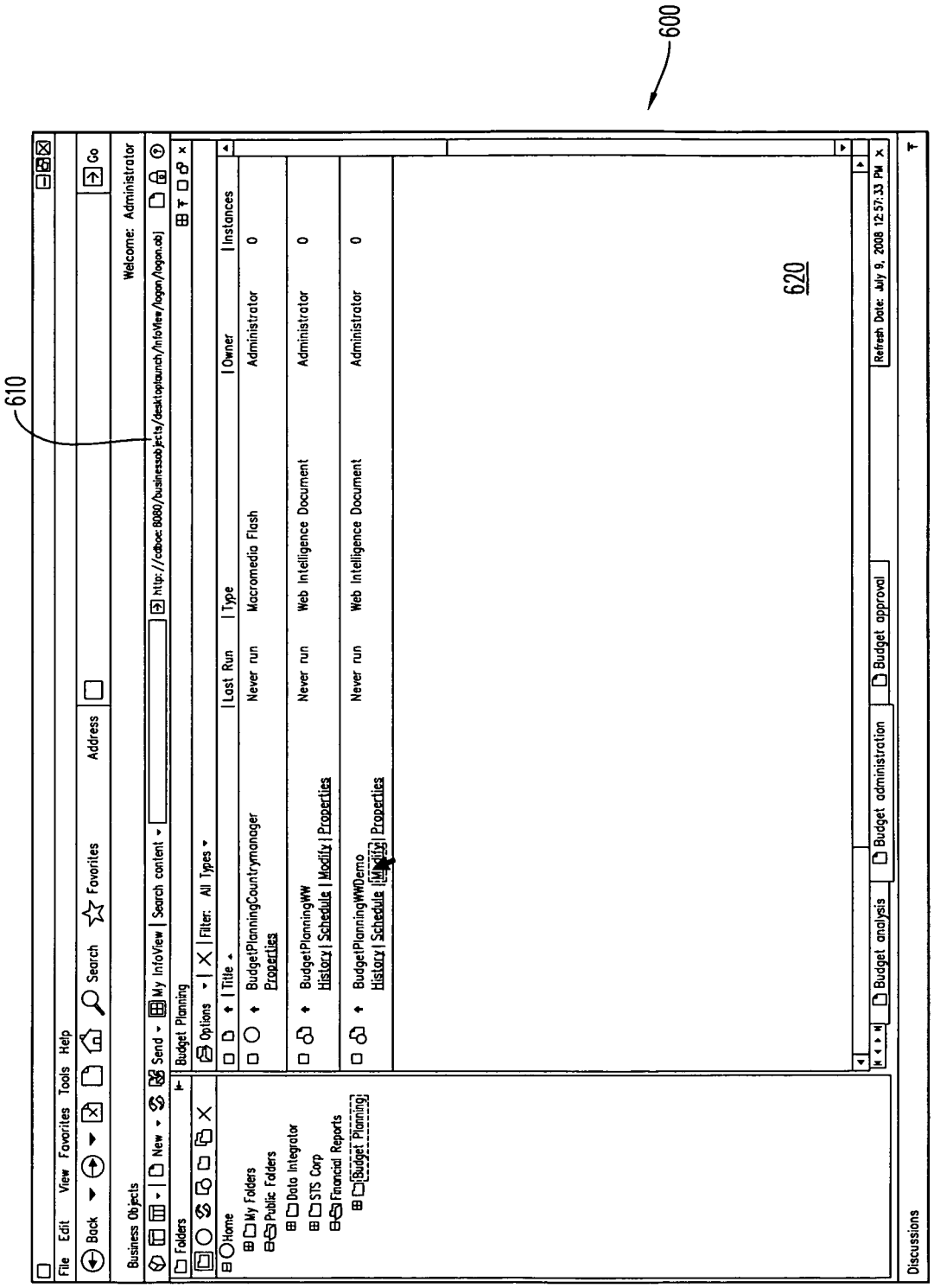

FIG. 6 is an outward view of user interface 600 according to some embodiments. User interface 600 may be displayed by a Web Browser executed by report designer 420. More particularly, a Uniform Resource Locator (URL) is entered into address field 610 and a corresponding query is sent to BI tier 410. The URL corresponds to UI portal 411, which operates, in response to the query, in conjunction with BI content beans 412 to generate user interface 600 and to provide user interface 600 to report designer 420.

User interface 600 includes window 620 presenting available reports. Repository 413 of BI tier 410 may store report specifications corresponding to these reports. FIG. 6 also illustrates user selection of a Modify link associated with a report entitled "BudgetPlanningWWDemo".

Selection of the Modify link causes report designer 420 to issue a request for the "BudgetPlanningWWDemo" report. In response, report engines 415 generate the report based on a corresponding report specification stored in repository 413 and on data of data sources 430 specified by the report specification. The report is returned to report designer 420 and displayed within user interface 700 of FIG. 7.

User interface 700 shows several contextual report elements, each of which is populated by data depending upon the dimension of the section in which the element is nested. For example, the "Year" dimension of cell 710 dictates the context of the main section of the report. Accordingly, the illustrated cells of table 720 are associated with the "Year" dimension of cell 710 and are populated with "2009" data based thereon.

Figure 7:
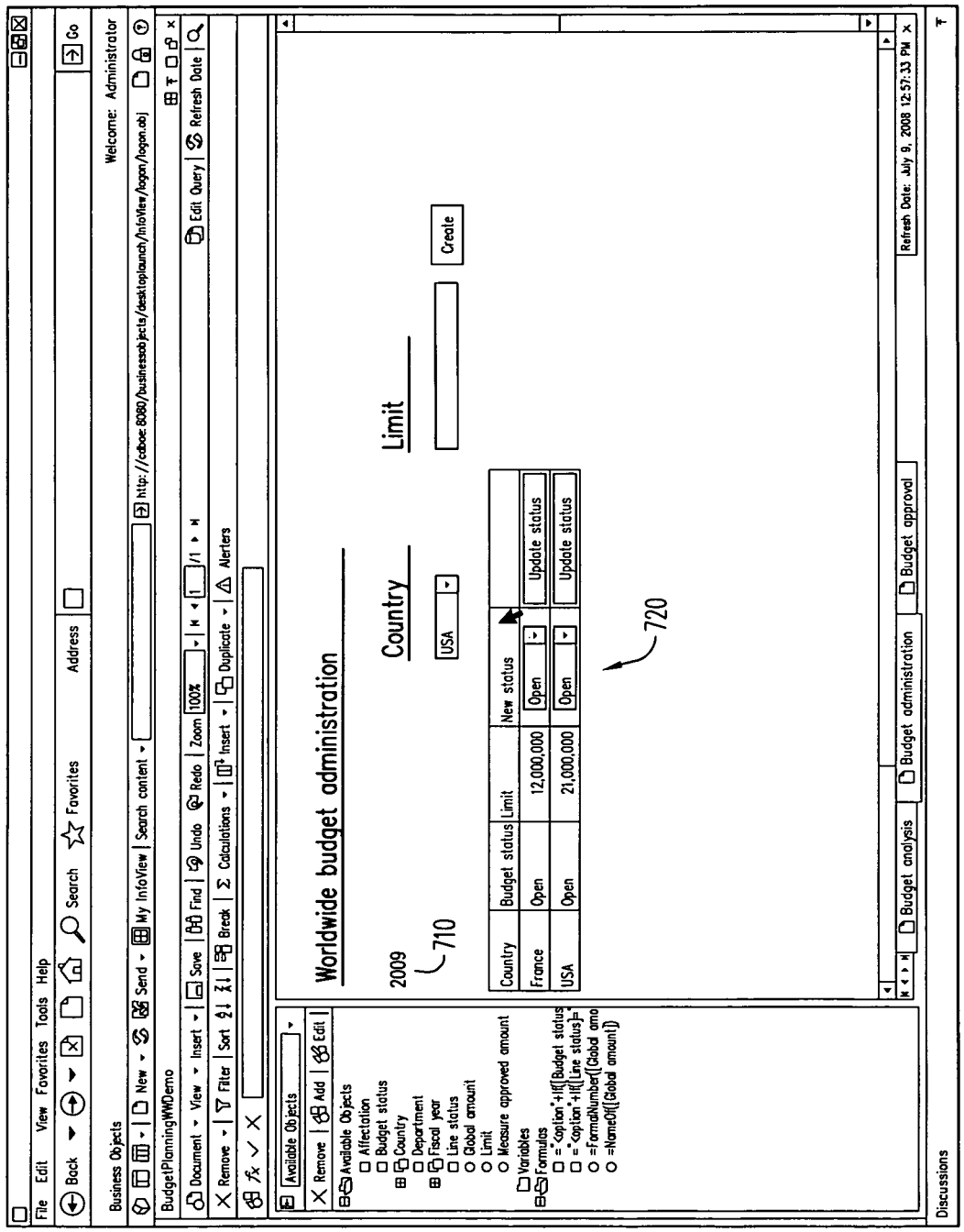
Figure 8:
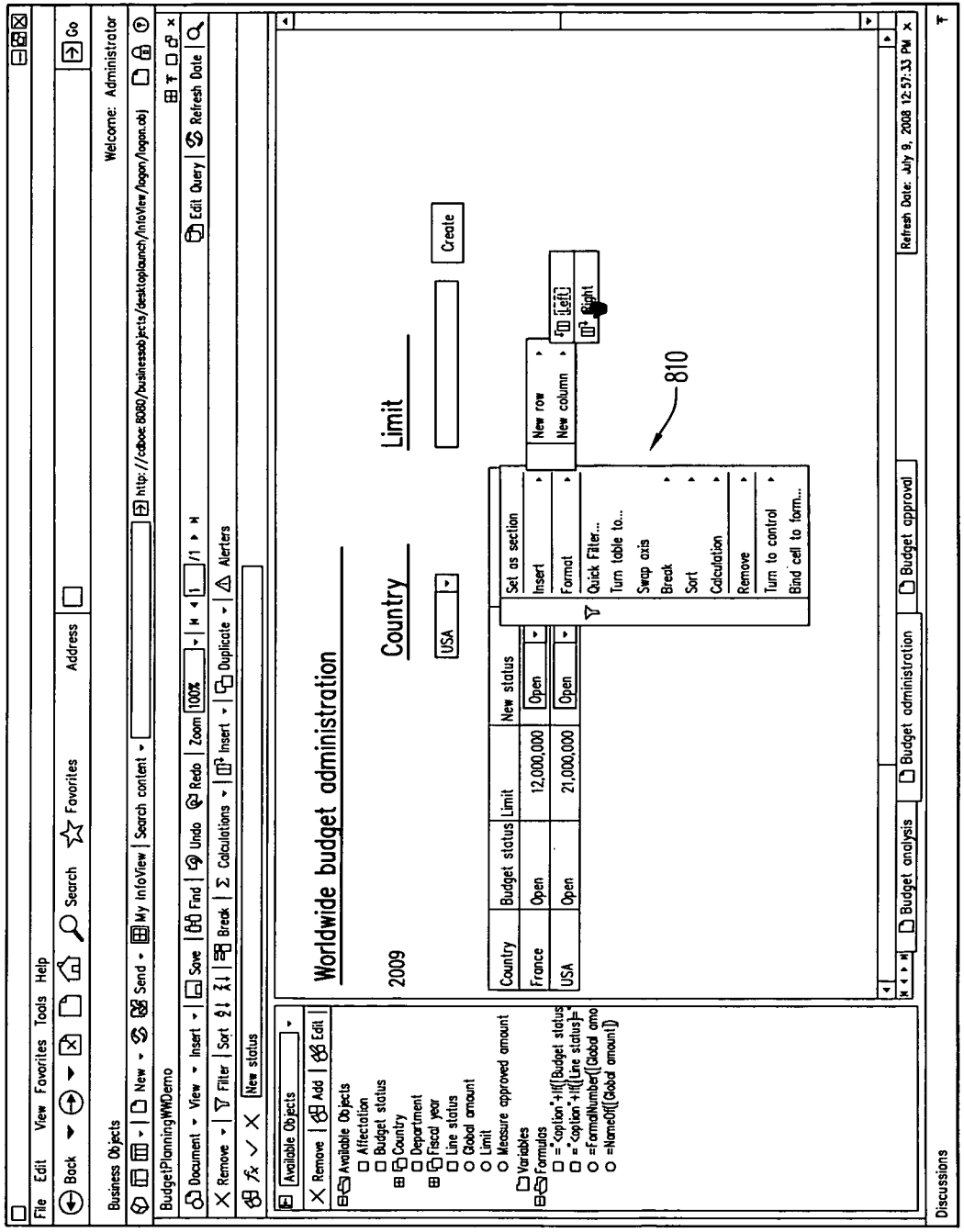

FIG. 7 further illustrates "right-clicking" on the New Status column of table 720, resulting in display of context menus 810 of FIG. 8. Context menus 810 may be generated by plug-ins, widgets or other code structures for extending the functionality of a generic Web Browser. A user may interact with context menus 810 as shown to create a column to the right of the New Status column of table 710.

Figure 9:
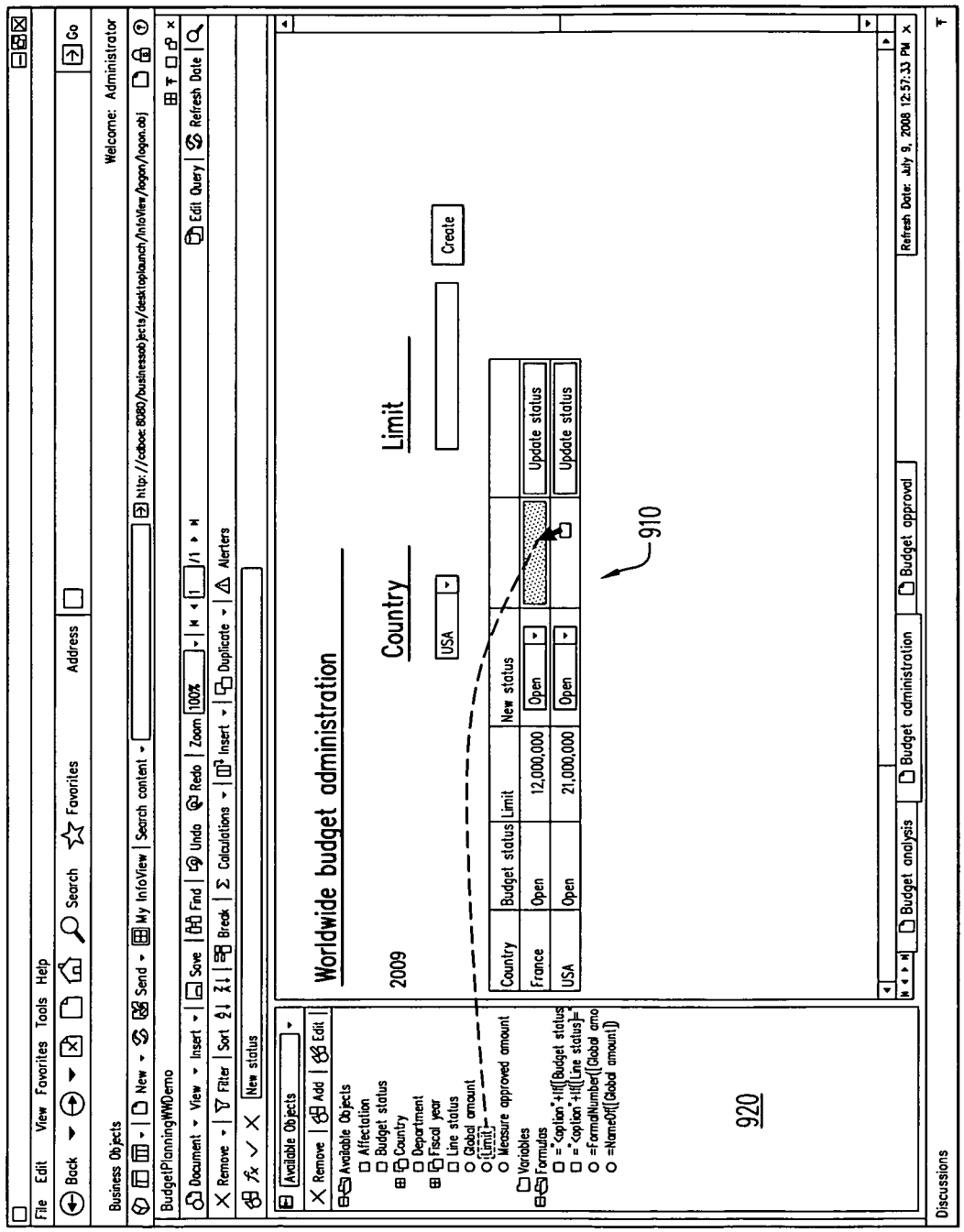

FIG. 9 illustrates association of column 910 with a dimension. More specifically, panel 920 displays dimensions, measures and details which may be associated with contextual report elements. These dimensions, measures and details may be filtered based on the type of report being modified, the user's role, and/or any other criteria. In the present instance, column 910 is being associated with a "Limit" dimension.

Figure 10:
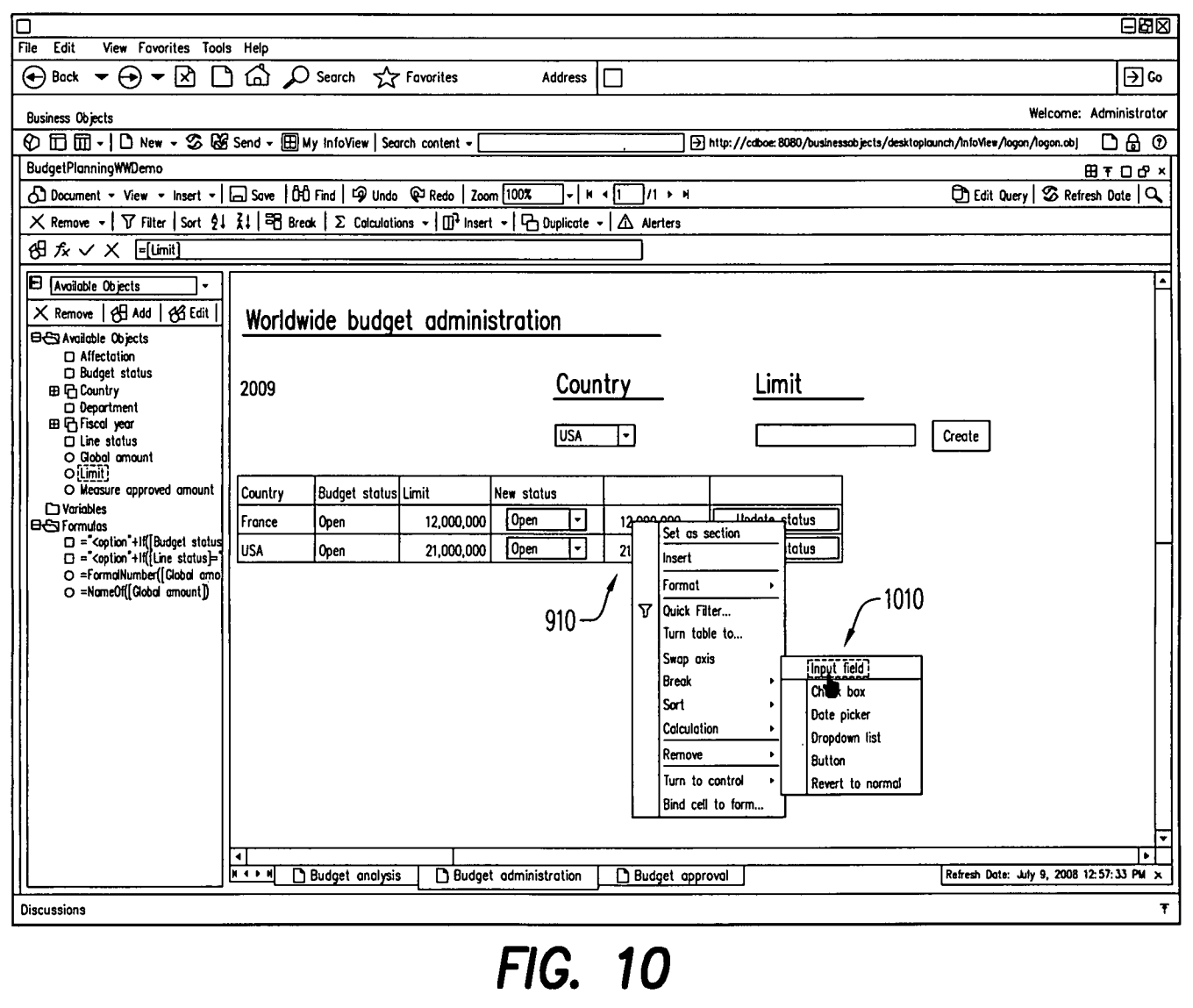

Column 910 is then labeled Limit as shown in FIG. 10. FIG. 10 also depicts another invocation of context menus (1010). The cells of column 910 are changed to input fields in response to the manipulation of context menus 1010 as shown in FIG. 10.

Figure 11:
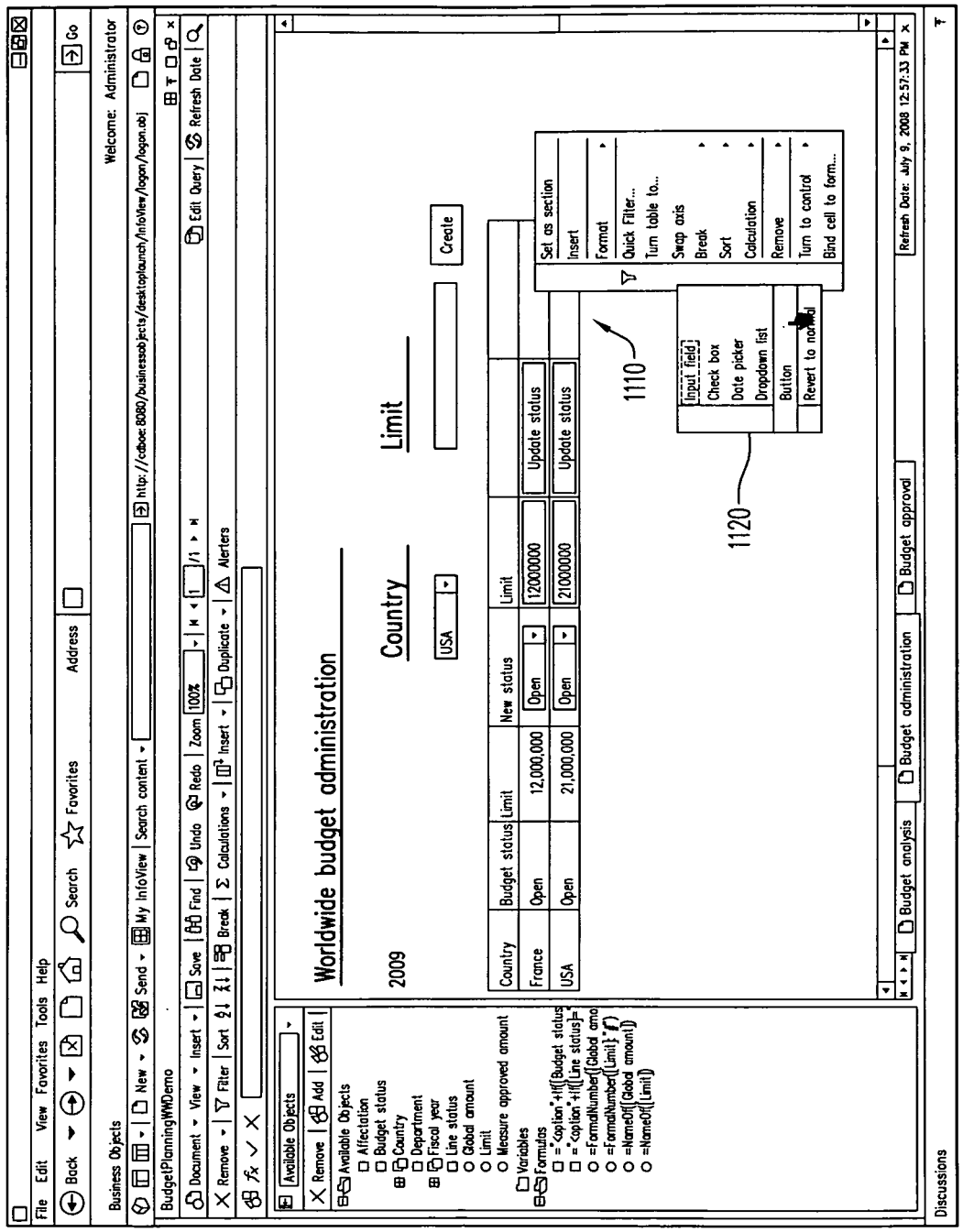
Figure 12:
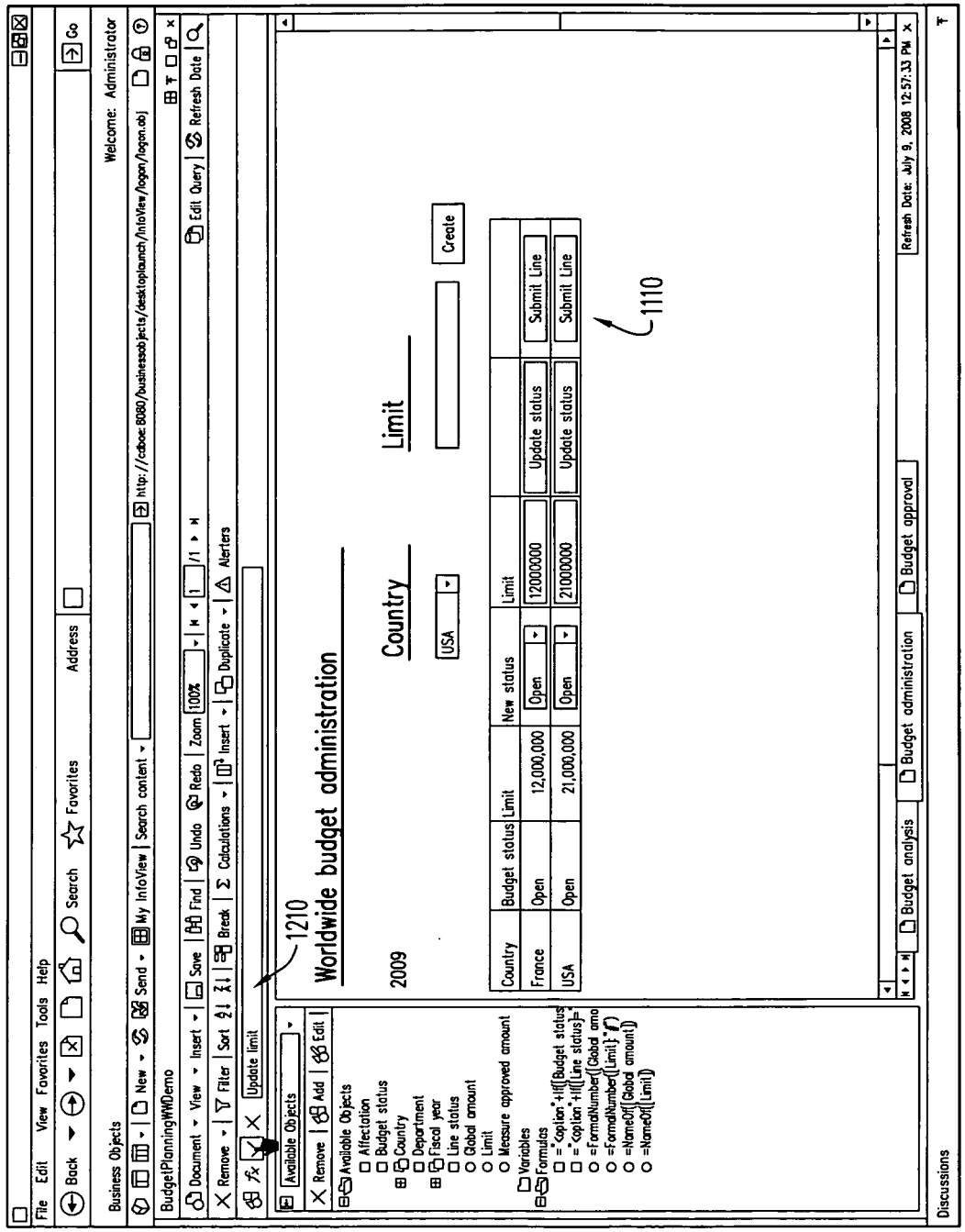

FIG. 11 further illustrates column 1110 created as described above with respect to column 910. Moreover, context menu 1120 has been invoked and is used to associate the cells of column 1110 with buttons. The buttons of column 1110 are shown in FIG. 12. Moreover, text is entered in field 1210 to associate with the newly-created buttons. As will be described below, the buttons will be usable to invoke and pass input parameters to a write back service.

In this regard, and returning to process 500, a write back service is associated with a contextual report specification at 505. A write back service according to the present embodiment is a Web Service that provides writing to a data source such as one of data sources 430. A catalog of Web Services 414 may provide a description of input parameters of such a write back service. Embodiments are not limited to use in conjunction with a write back service.

Figure 13:
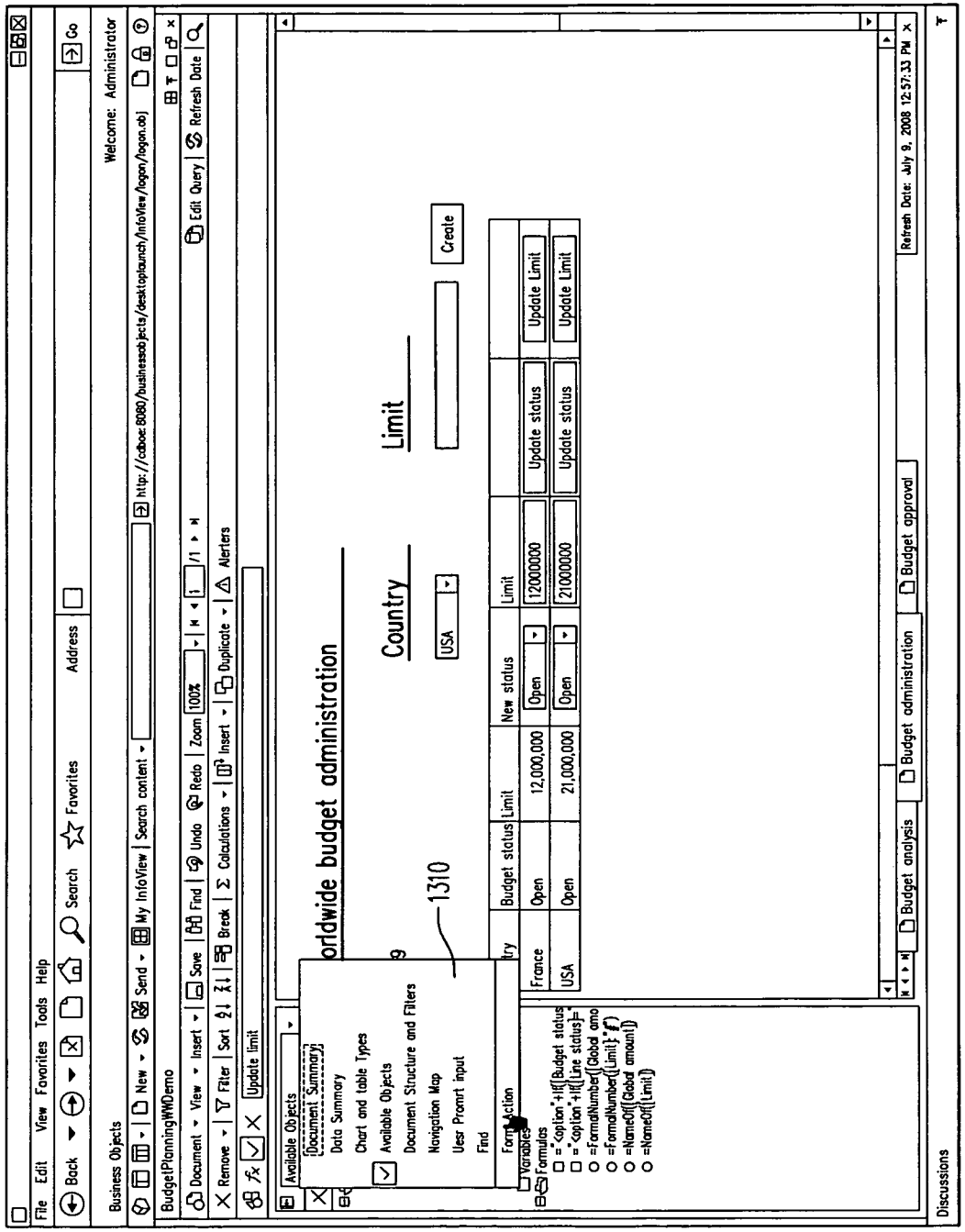

A contextual report specification includes at least one report element which is populated by data depending upon the dimension(s) of the section(s) in which the element is nested. Report template 100 represents a contextual report specification according to some embodiments. Process 500 will be described with respect to the contextual report specification depicted in FIG. 13.

Figure 14:
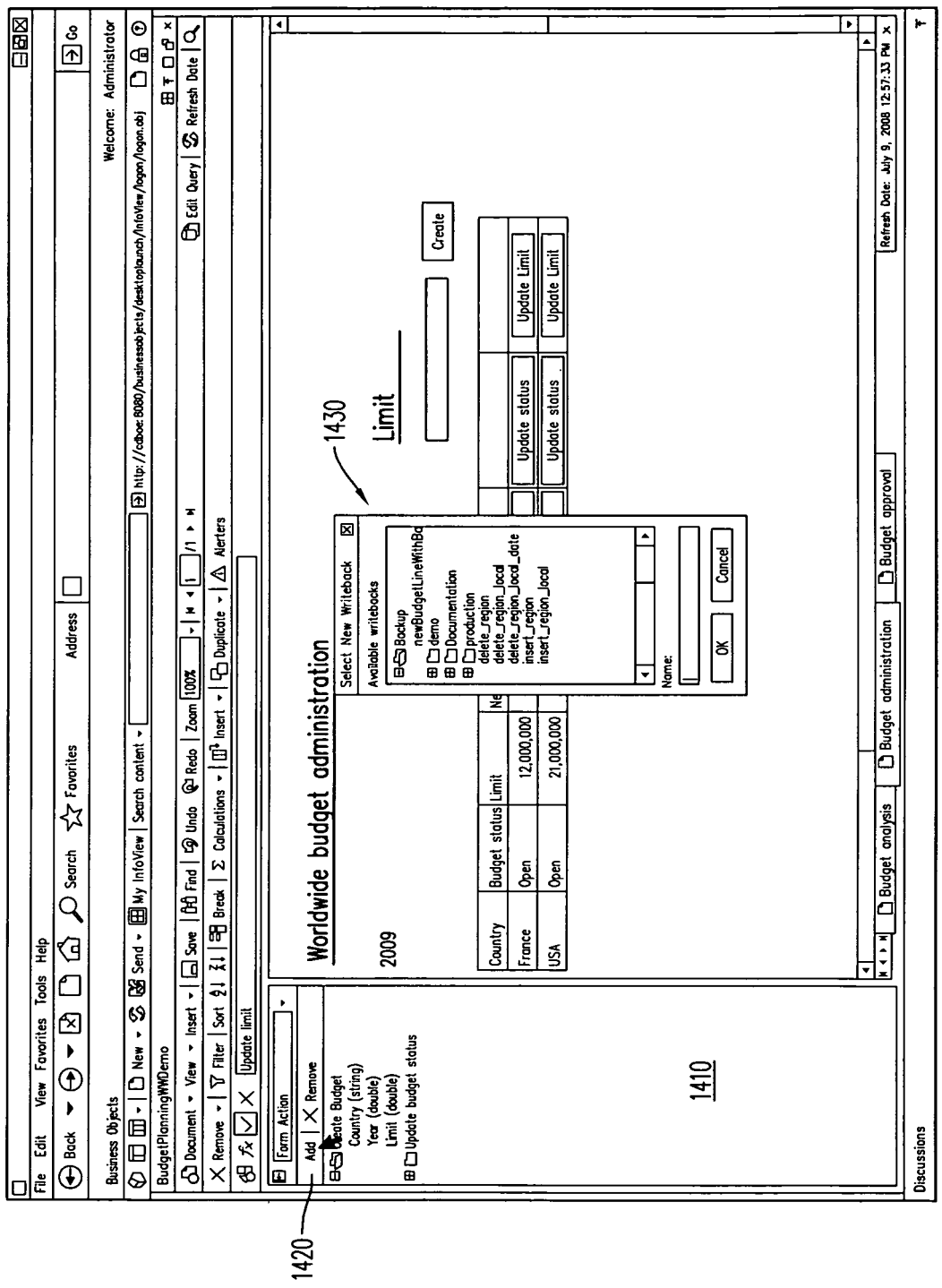

According to some embodiments of 505, a user accesses pull-down menu 1310 and selects the Form Action menu item therefrom. Form Action panel 1410 of FIG. 14 is displayed in response, the content of which may be provided by UI portal 411. Panel 1410 displays all named service instances which are associated with the current report specification. Each named service instance corresponds to one of Web Services 414, and each is associated with one or more input parameters. The input parameter may comprise primitive parameters (e.g., string, numeric, date/time) or list parameters.

Figure 15:
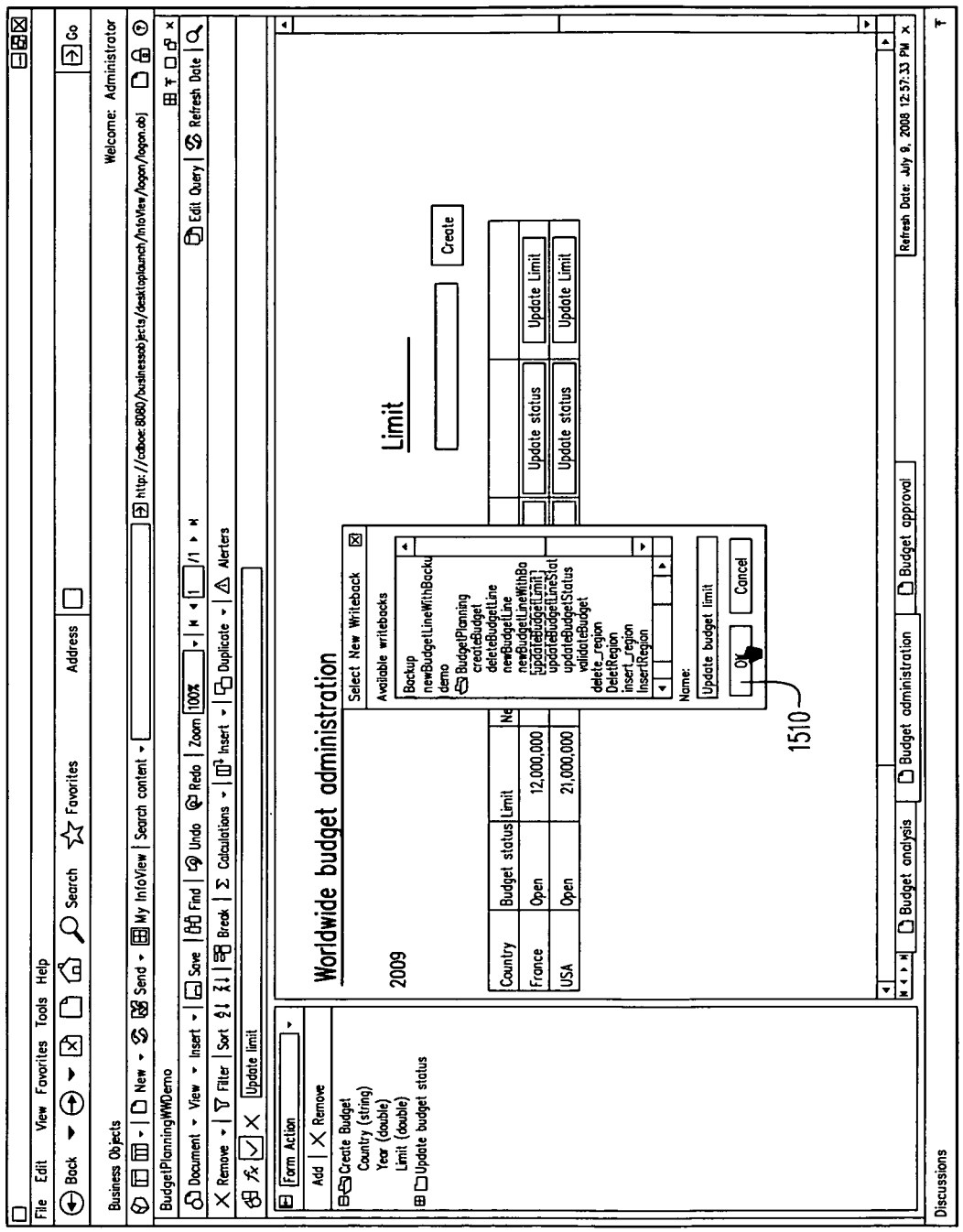

The user has selected Add button 1420, resulting in the display of window 1430. Window 1430 displays Web Services 414 exposed by BI tier 410. More specifically, the list of Web Services of window 1430 may be obtained from the catalog of Web Services 414. FIG. 15 illustrates navigation of the list and selection of a write back service. The user has also entered a name "Update Budget Limit" to associate with the selected write back service.

Figure 16:
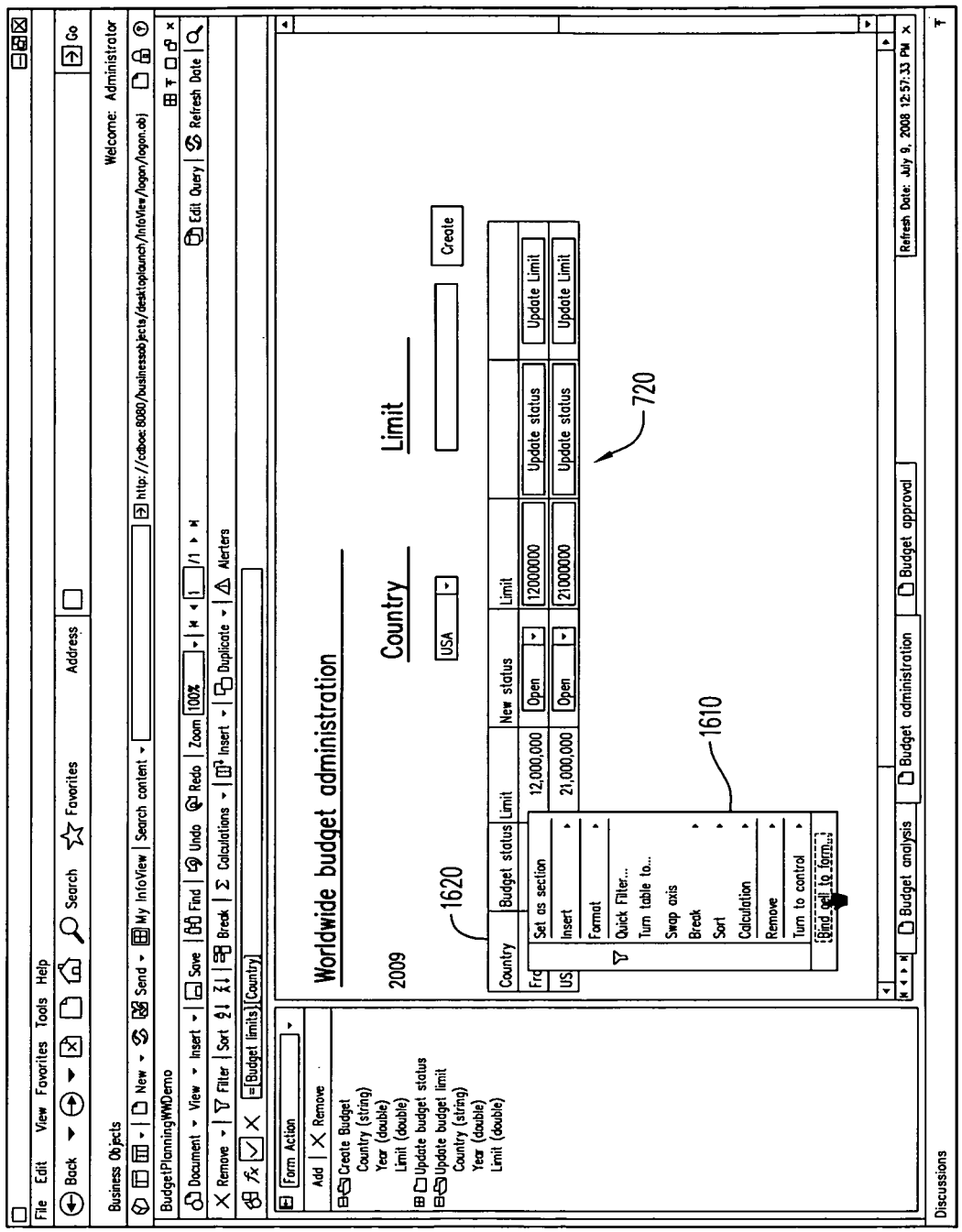

The write back service is associated with the current contextual report specification at 505 upon selection of OK button 1510. Moreover, a named instance (i.e., named "Update Budget Limit") of the write back service is created and associated with the report specification at 510. The named service instance may be stored in repository 413. FIG. 16 shows the created named service instance within panel 1410, as well as its associated input parameters (e.g., determined from the Catalog of Web Services 414).

At 515, an element of a report section is associated with an input parameter of the named instance of the service. The element is associated with a data dimension and with a context of the report section. FIG. 16 illustrates selection of the Country column of table 720 at 515. The "Bind Cell to Form" option of displayed context menu 1610 is then selected to initiate the association at 515.

Figure 17:
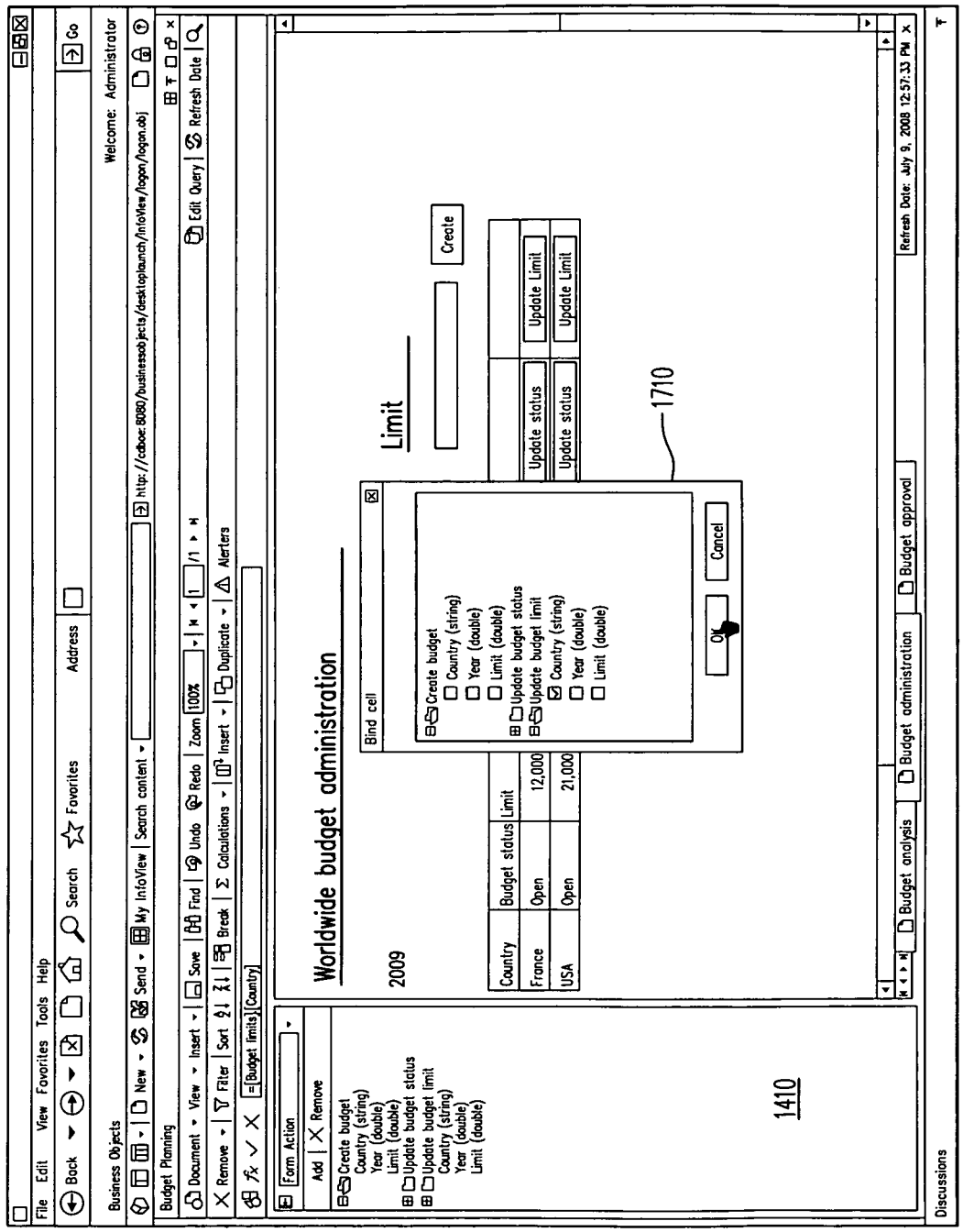
Figure 18:
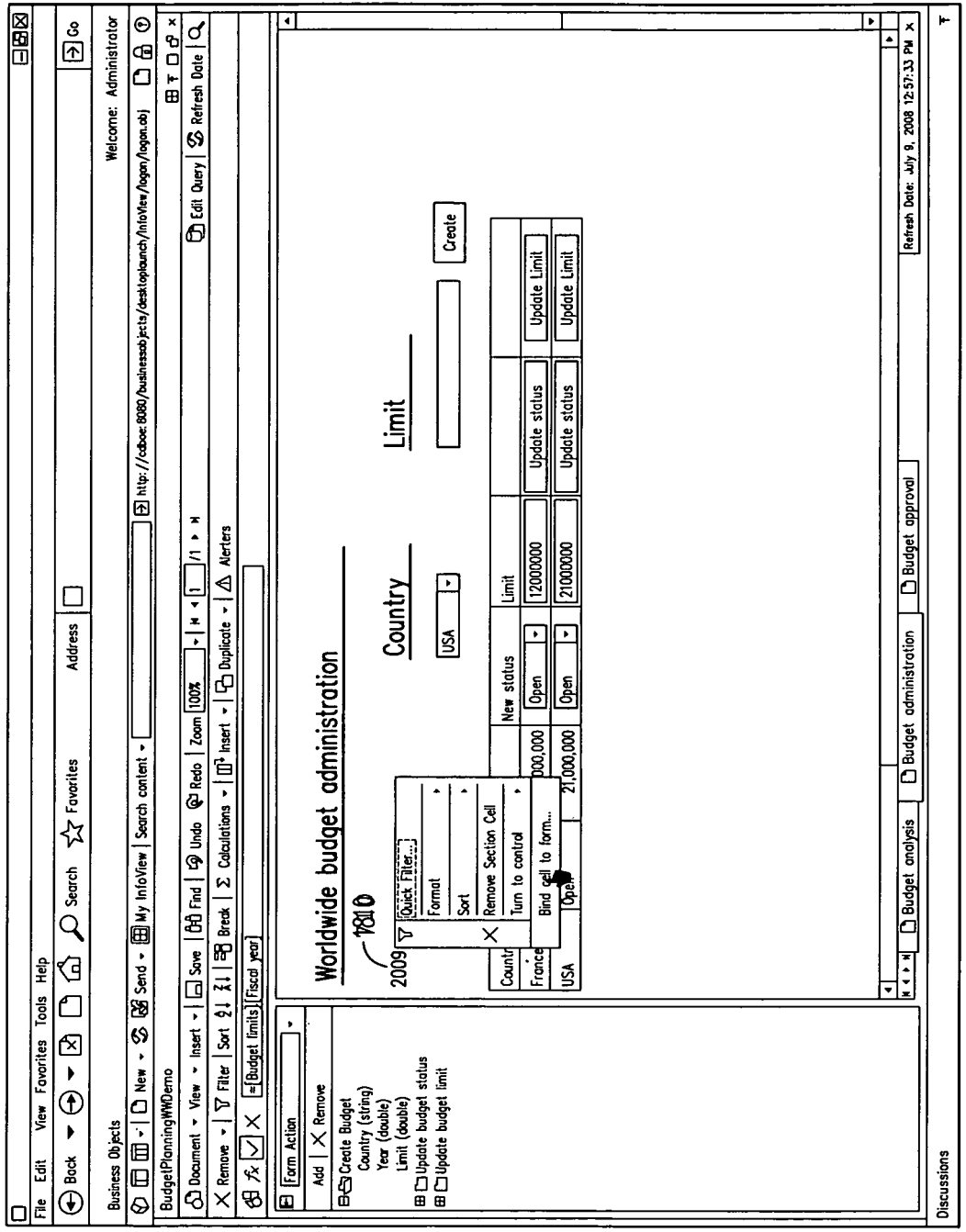
Figure 19:
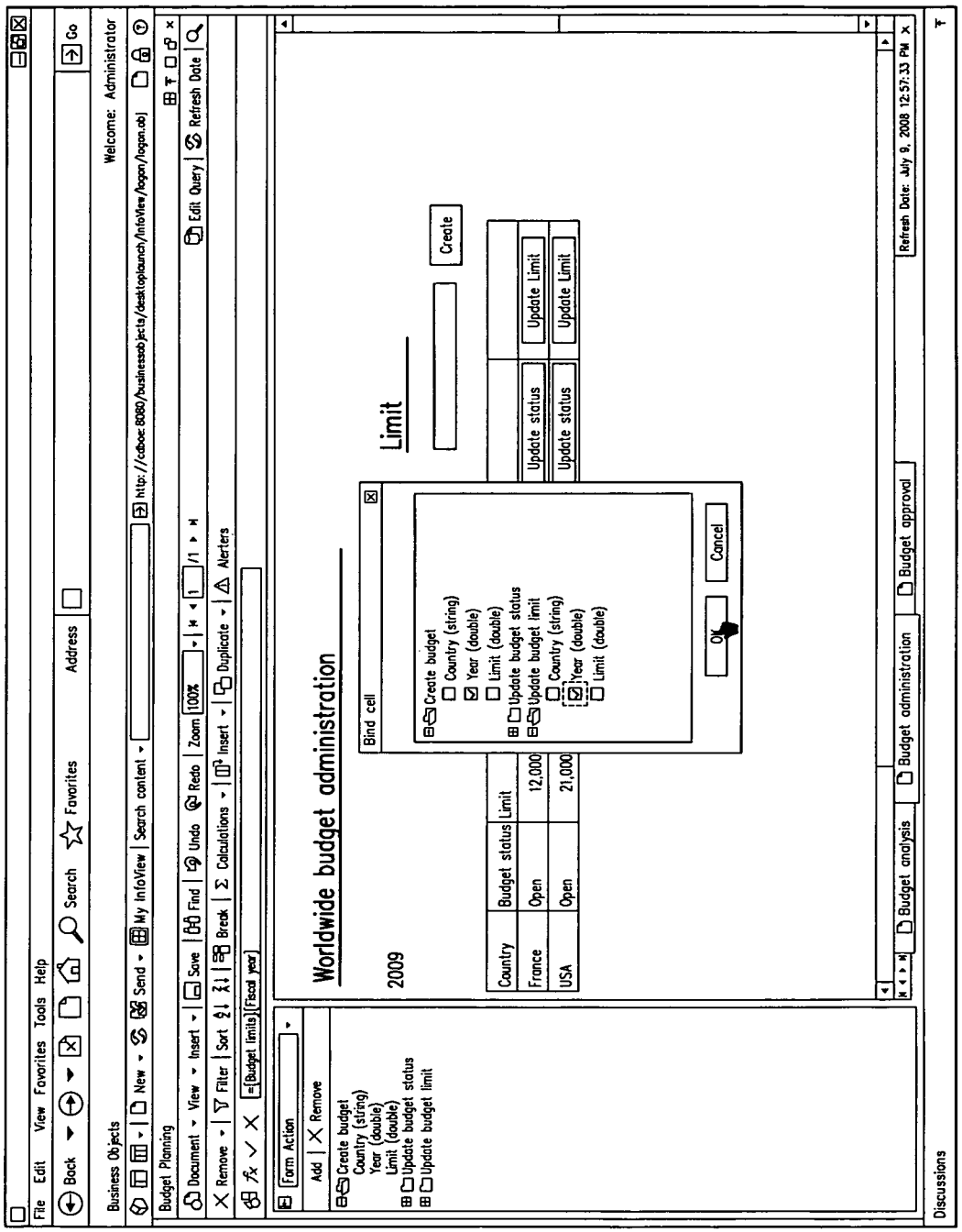
Figure 21:
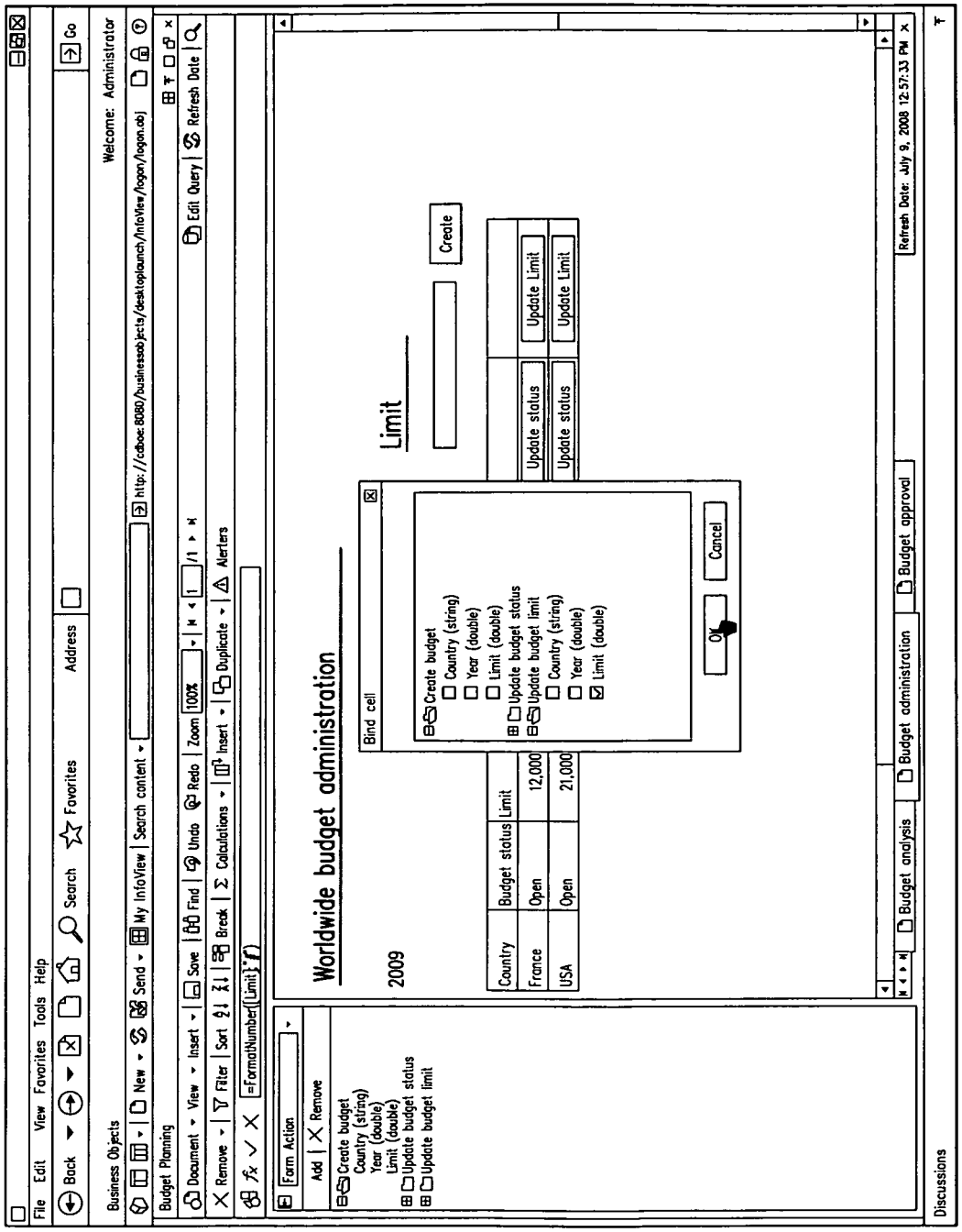

More particularly, and as shown in FIG. 17, window 1710 displays each of the named service instances associated with the current report specification. Window 1710 also displays the input parameters of each named service instance and their parameter types. In some embodiments, window 1710 does not display those service instances of panel 1410 which are already associated with another block of the report specification, or which are associated with parameter types that are each incompatible with the selected report element (e.g., a list parameter in a case that the selected element is a free cell). In the present example, the selected report element (i.e., Country column 1620) is mapped to the input parameter "Country" of the "Update Budget Limit" service instance.

Next, at 520, it is determined whether more input parameters of the created named service instance are to be associated with report elements. If so, flow cycles between 520 and 515 as additional report elements are associated with (i.e., mapped to) respective input parameters. For example, FIGS. 18 through 21 illustrate two of such cycles. Particularly, FIGS. 18 through 21 illustrate the association of Year cell 710 with the Year input parameter of the named service instance, and the association of the Limit column 2010 of table 720 with the Limit input parameter of the named service instance. According to some embodiments, input parameter types that are incompatible with a selected report element may be unselectable (e.g., greyed out).

Figure 22:
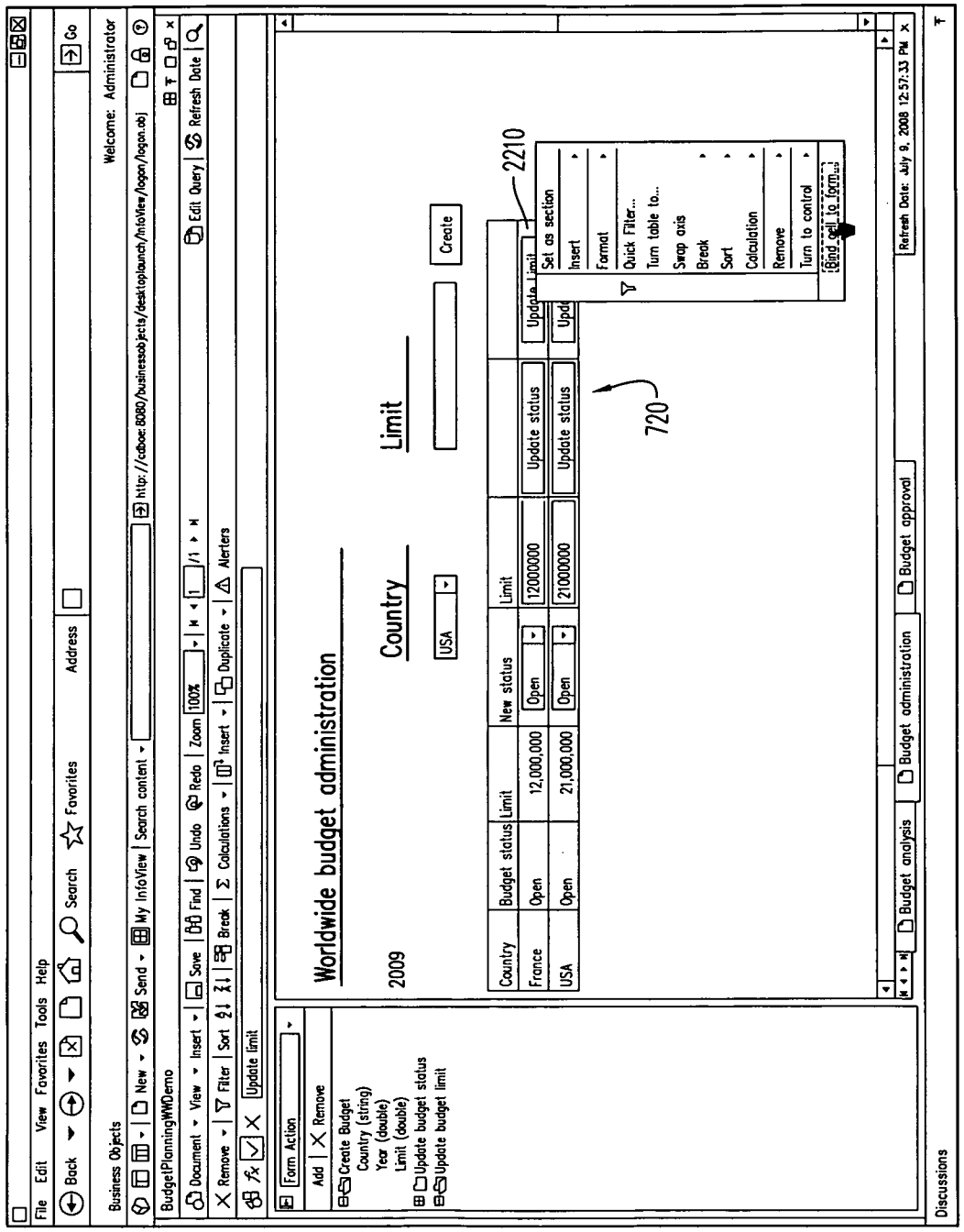
Figure 23:
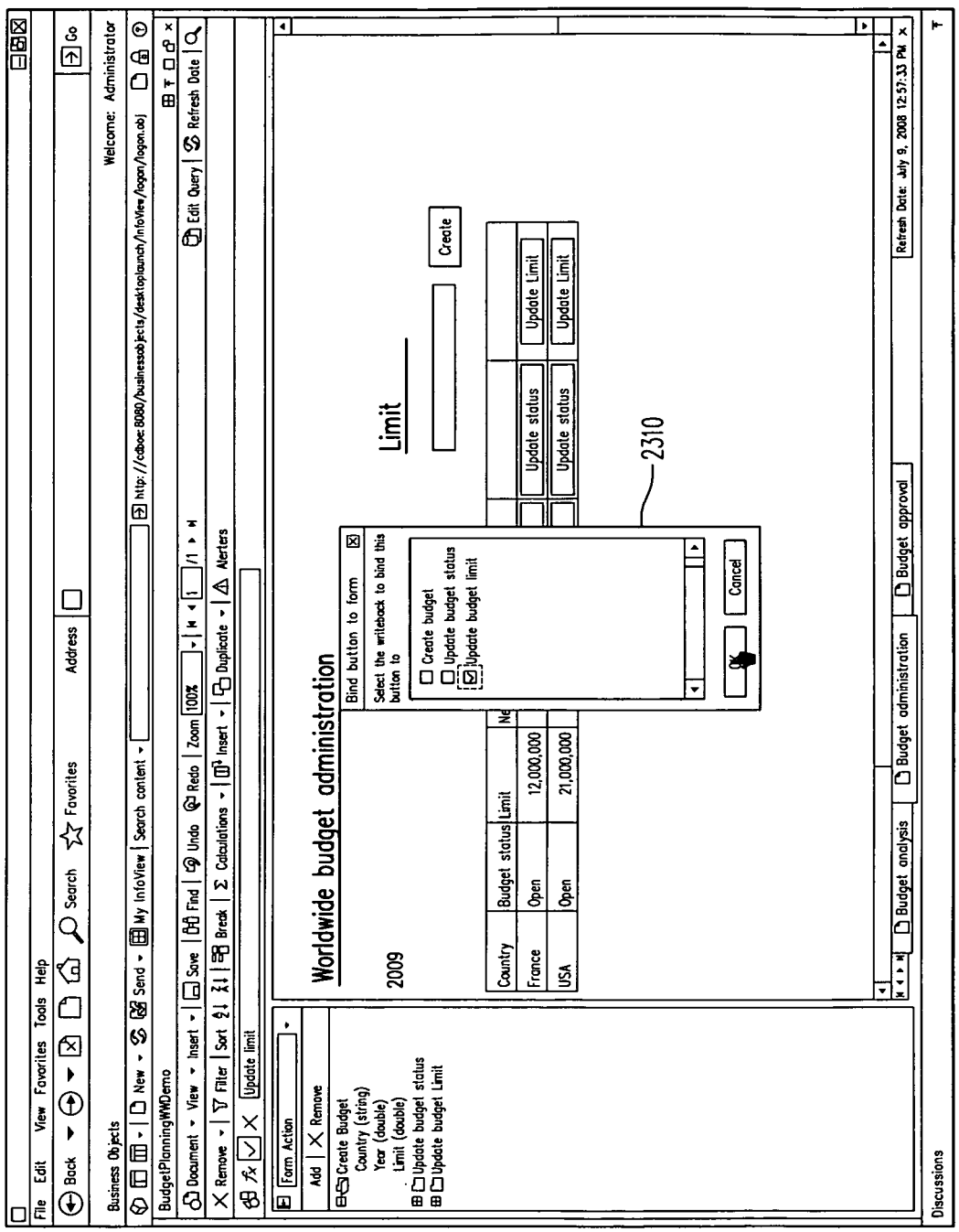

Flow proceeds to 525 once the determination at 520 is negative. A submission control of the report specification is associated with the named service instance at 525. For example, FIG. 22 illustrates right-clicking on the Update Limit buttons 2210 of table 720 and selection of the "Bind Cell to Form" context menu option. Unlike selection of the same menu option with respect to the other report elements, selection of the "Bind Cell to Form" menu option with respect to a button results in display of window 2310 of FIG. 23. Window 2310 allows association of the selected buttons with the named service instance "Update Budget Limit".

Figure 24:
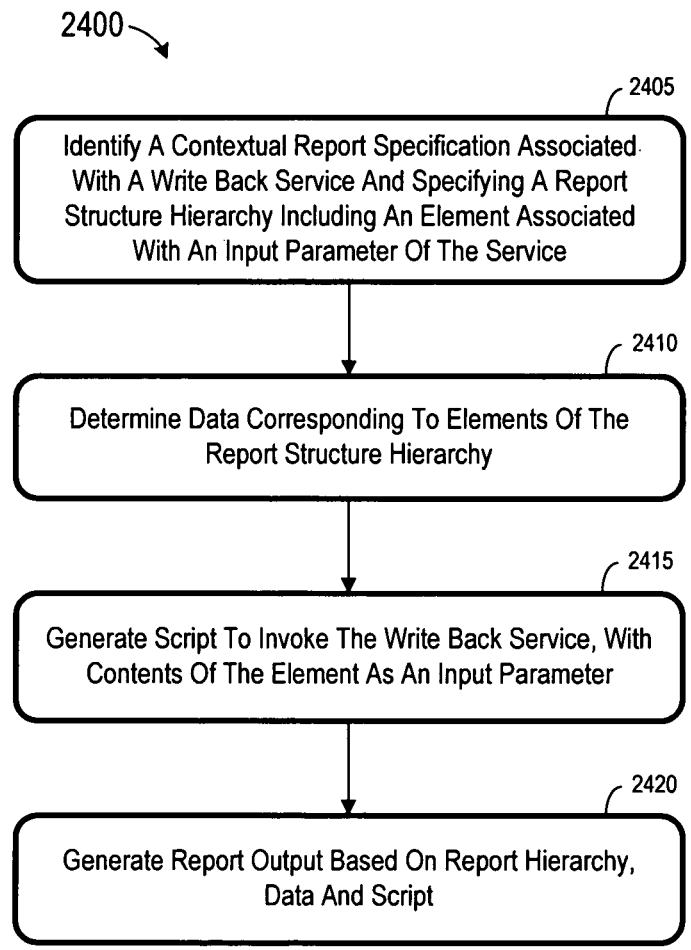
FIG. 24 is a flow diagram of a process according to some embodiments.

Accordingly, selection of an "Update Limit" button of a particular row of table 720 will cause invocation of the named service instance, with the Year of Year cell 710, the Country specified in the particular row, and the Limit specified in the particular row as input parameters. According to some embodiments, a similar button might be placed in the area above table 720 and also associated with the named service instance as described above. Selection of such a button will cause invocation of the named service instance, with the Year of Year cell 710, each Country of table 720, and the Limit associated with each country as input parameters. Therefore, although both invocations utilize the same input parameter-to-report element bindings, the context in which the submission control resides may determine the type of data passed to the service. The associations of process 500 may be stored in the current report specification as metadata relating to each block of the report specification. FIG. 24 is a flow diagram of process 2400 to generate a report output based on such a report specification according to some embodiments.

A contextual report specification is identified at 2405. For example, browsing client 440 may access UI portal 411 and request a report, and a report specification associated with the report may be identified at 2405 in response. The identified report specification is associated with a write back service and specifies a report structure hierarchy including an element associated with an input parameter of the service.

Accordingly, the identified report specification may comprise a report specification generated according to process 500, but embodiments are not limited thereto.

Next, at 2410, data is determined corresponding to elements of the report structure hierarchy. As is known in the art, report engine 415 may determine data from data sources 430 with which to populate contextual report elements based on the identified specification. In some embodiments, data is determined at 2410 for the report element associated with an input parameter of the write back service.

A script is generated at 2415 to invoke the write back service. The script may comprise any code (e.g., Javascript) that is executable by a suitable execution engine. The script is executable to invoke the write back service, and to include contents of the above-mentioned report element as an input parameter of the write back service. Generation of the script is based on the report specification which, as described with respect to process 500, specifies associations between the various input parameters of the write back service and the report elements, as well as a submission control of the report that is associated with the write back service.

A report output is generated at 2420 based on the report structure hierarchy, the determined data, and the generated script. More specifically, the physical layout of the report elements may be generated based on the hierarchy, the data may be used to populate the elements, and the script may be placed in a suitable portion of the report output (e.g., at the end). Report engines 415 may generate the report output in any suitable format. The report output may be generated in a generic format to facilitate rendering to any of several alternative formats (e.g., HTML, PDF, Java).

Figure 25:
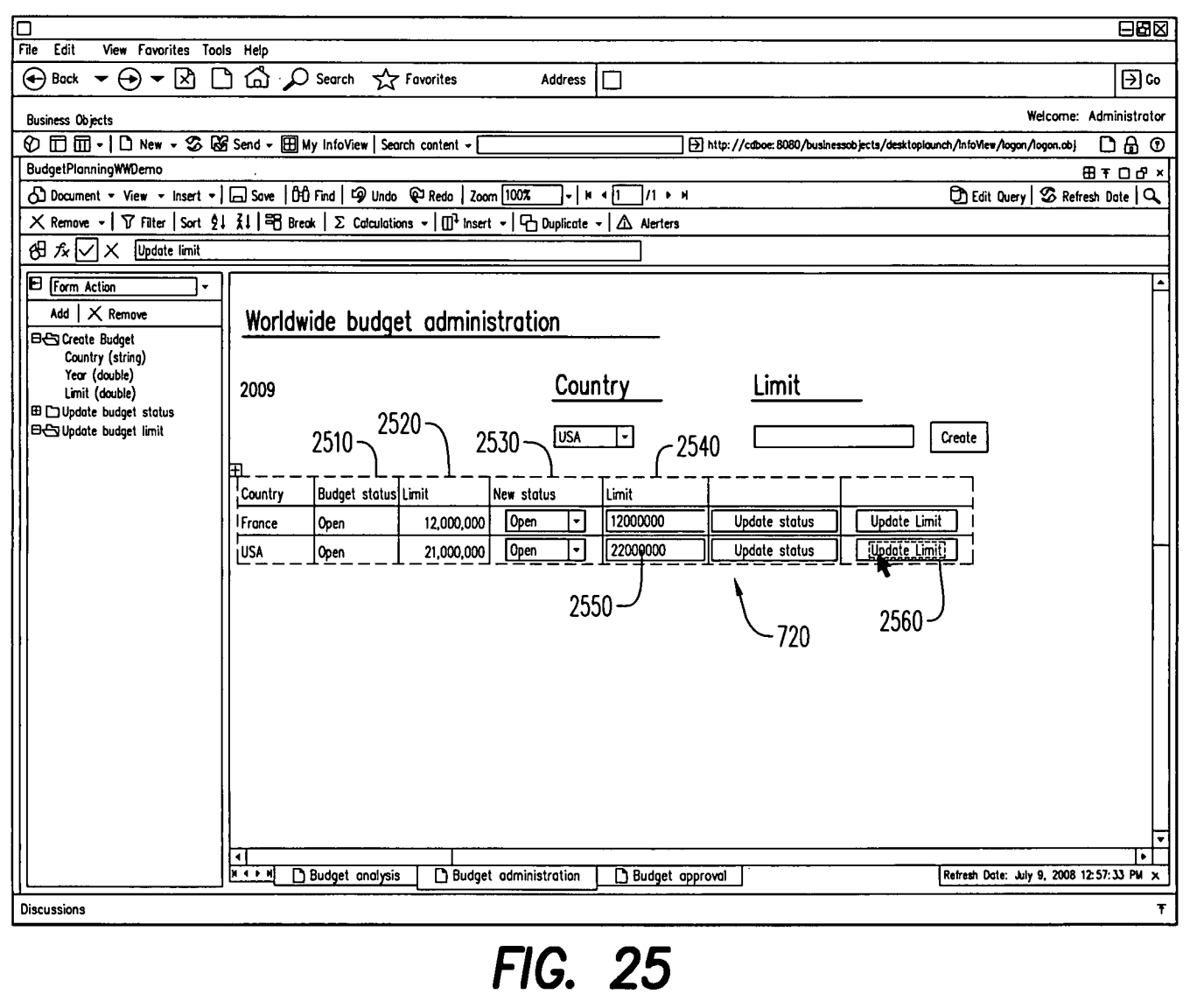

FIG. 25 illustrates usage of a report output according to some embodiments. The report output presented by FIG. 25 reflects the report specification whose generation was described with respect to process 500. It will be assumed that a corresponding report output was generated according to process 2400 and provided to browsing client 440 for display.

FIG. 25 illustrates populated values of statics Budget Status column 2510 and Limit column 2520 of table 720. Report engines 415 may have also populated input columns New Status 2530 and Limit 2540 of table 720 with these values upon generation of the corresponding report output. As shown in FIG. 25, the value of field 2550 of the second row of the input column Limit 2540 has been changed by a user of browsing client 440 from 21000000 to 22000000. The user then selects Update Limit button 2560.

As described above, button 2510 has been defined as a submission control associated with the Update Budget Limit named instance of the updateBudgetLimit service. This association was reflected in the report specification, and therefore a corresponding invocation script of the report output is tied to button 2510. The script is intended to invoke the service and to pass appropriate input parameters thereto. The input parameters are based on the associations between input parameters and report elements that are specified in the corresponding report specification on which the script is based.

FIG. 26 illustrates service interface 2600 according to some embodiments. Service interface 2600 may be stored in the Catalog of Web Services 414. Interface 2600 may be used to determine the names and types of input parameters during mapping as described with respect to process 500. FIG. 27 illustrates XML data 2700 generated by script of a report output based on service interface 2600. XML data 2700 provides data values for the input parameters specified by service interface 2600. The data values are obtained from contextual report elements that are associated with the input parameters by the corresponding report specification.

Figure 28:
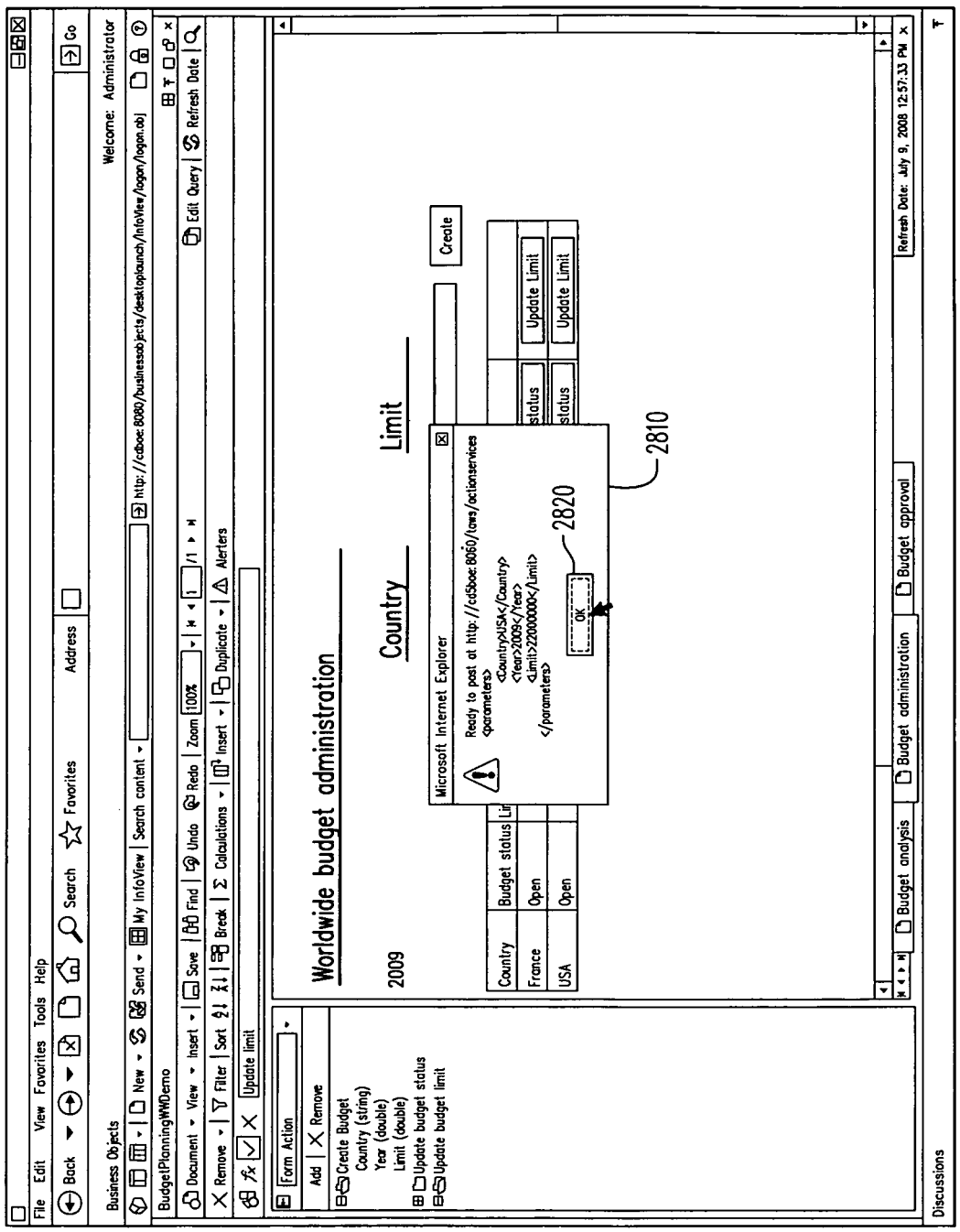
Figure 29:
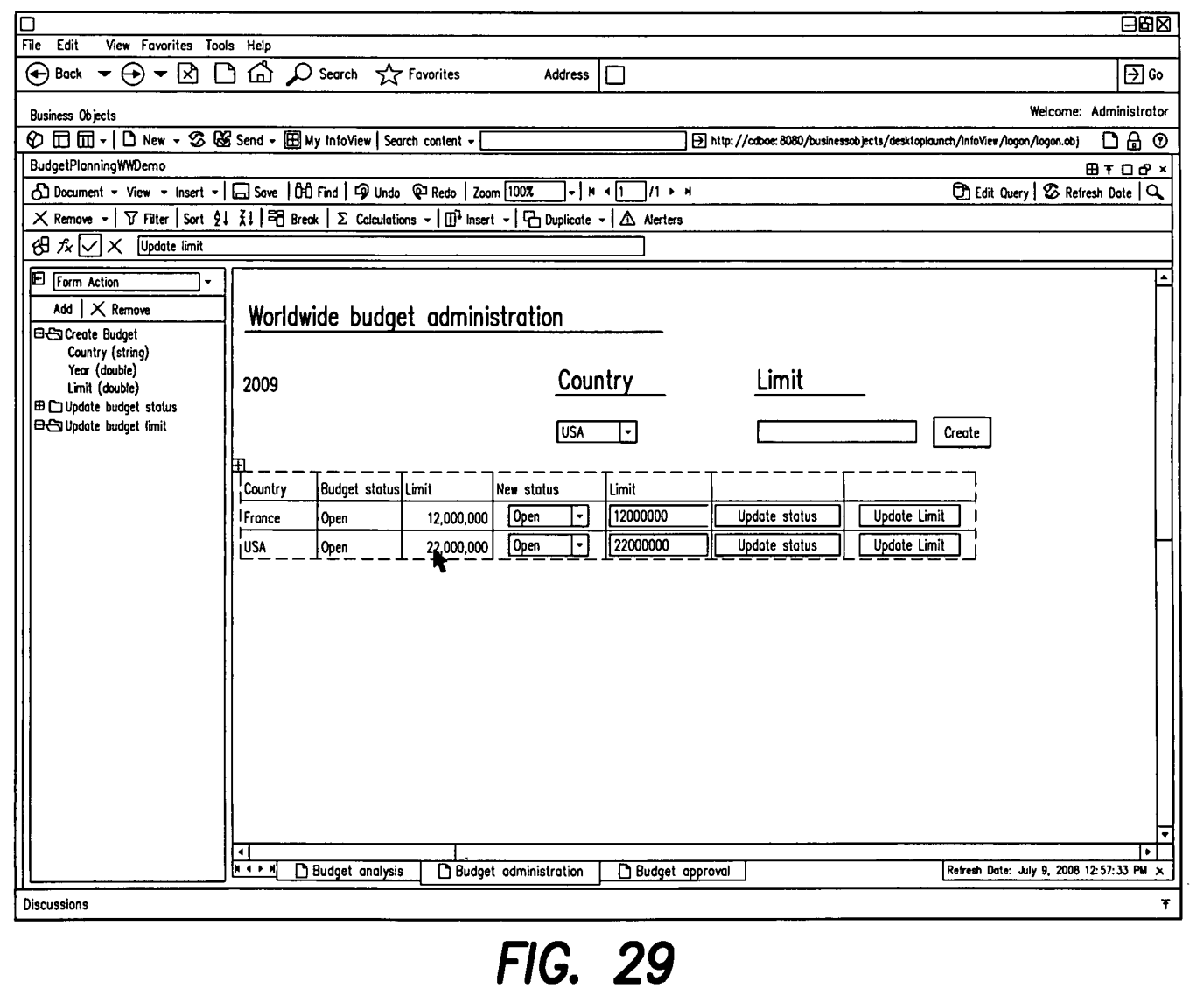

FIG. 28 illustrates dialog box 2810 which is presented after selection of button 2510 according to some embodiments. Dialog box 2810 indicates the specific parameters that will be passed to the service that is associated with button 25 10. These parameters correspond to the associations established in the above-described example of process 500. Selection of OK button 2820 results in invocation of the service to write the data to data sources 430. FIG. 29 illustrates the subject report upon refresh. As shown, the second row of the static Limit column specifies the changed value of 22,000,000.

The embodiments described herein are solely for the purpose of illustration. Those in the art will recognize that other embodiments may be practiced with modifications and alterations limited only by the claims.

What is claimed is:

1. A method comprising:

displaying a report in a view in a graphical user interface, the report including a first report section displayed in the view in the graphical user interface, the first report section displayed in the view including: (i) a table having a plurality of rows and a plurality of columns and (ii) data that populates a contextual element, indicates a context of the first report section and is displayed in the view at a location outside of the rows and the columns of the table;

receiving, via the graphical user interface while displaying the report in the graphical user interface, a request to create a first submission control;

creating the first submission control in response to the request, received via the graphical user interface while displaying the report in the graphical user interface, to create the first submission control;

receiving, via the graphical user interface while displaying the report in the graphical user interface, a request to associate the first submission control with a software service;

associating the first submission control with the software service in response to the request, received via the graphical user interface while displaying the report in the graphical user interface, to associate the first submission control with the software service;

receiving, via the graphical user interface while displaying the report in the graphical user interface, a selection of a cell in the table, the cell associated with a data dimension and with the context of the first report section;

receiving, via the graphical user interface while displaying the report in the graphical user interface, a request to associate the cell with a first input parameter of the software service;

associating the cell with the first input parameter of the software service in response to the request, received via the graphical user interface while displaying the report in the graphical user interface, to associate the cell with the first input parameter of the software service;

receiving, via the graphical user interface while displaying the report in the graphical user interface, a request to associate the contextual element with a second input parameter of the software service distinct from the request to associate the cell with the first input parameter of the software service; and associating the contextual element with the second input parameter of the software service in response to the request, received via the graphical user interface while displaying the report in the graphical user interface, to associate the contextual element with the second input parameter of the software service;

wherein the first submission control that is created in response to the request, received via the graphical user interface while displaying the report in the graphical user interface, to create the first submission control, comprises a first button located in the first report section of the report;

wherein selection of the first button located in the first report section of the report causes invocation of the software service and passage of first data of the report as input parameters to the software service, the first data including: (i) data populating the cell in the table and (ii) the data that: (a) is displayed in the view at a location outside of the rows and the columns of the table and (b) populates the contextual element that was associated with the second input parameter of the software service in response to the request that was distinct from the request to associate the cell with the first input parameter of the software service and received via the graphical user interface while displaying the report in the graphical user interface;

wherein the report further includes a second report section displayed in the same view as the first report section; and wherein associating the cell with the first input parameter of the software service comprises:

creating a mapping of input parameters of the software service to data dimensions associated with report elements, the method further comprising:

receiving, via the graphical user interface while displaying the report in the graphical user interface, a request to create a second submission control;

creating the second submission control in response to the request to create the second submission control;

wherein the second submission control comprises a second button located in the second report section of the report;

wherein selection of the second button located in the second report section of the report causes invocation of the software service and passage of second data of the report as the input parameters to the software service;

wherein the first data is based on the mapping and the context of the first report section with which the cell in the table is associated, and wherein the second data is based on the mapping and a context of the second report section;

the method further comprising:

receiving, via the graphical user interface while displaying the report in the graphical user interface, a request to create a third submission control; and creating the third submission control in response to the request to create the third submission control;

wherein the third submission control comprises a third button located in the report; and wherein selection of the third button located in the report causes invocation of the software service and passage of the first data of the report and the second data of the report as the input parameters to the software service.

2. A method according to claim 1, wherein the first report section is associated with a report specification, the method further comprising:

associating the software service with the report specification.

3. A method according to claim 2, further comprising:

creating a named instance of the software service, the named instance being associated with the report specification.

4. A method according to claim 1, wherein the cell is associated with one of a row, a column and a table, and wherein associating the cell with the first input parameter of the software service comprises:

associating the one of the row, the column and the table with the first input parameter of the software service.

5. A method according to claim 1, wherein the software service comprises a Web Service.

6. A method according to claim 5, wherein the software service comprises a write back service.

7. A method comprising:

displaying a report in a view in a graphical user interface, the report including a first report section displayed in the view in the graphical user interface, the first report section displayed in the view including: (i) a table having a plurality of rows and a plurality of columns and (ii) data that populates a contextual element, indicates a context of the first report section and is displayed in the view at a location outside of the rows and the columns of the table;

receiving, via the graphical user interface while displaying the report in the graphical user interface, a request to create a first submission control;

creating the first submission control in response to the request, received via the graphical user interface while displaying the report in the graphical user interface, to create the first submission control;

receiving, via the graphical user interface while displaying the report in the graphical user interface, a request to associate the first submission control with a software service;

associating the first submission control with the software service in response to the request, received via the graphical user interface while displaying the report in the graphical user interface, to associate the first submission control with the software service;

receiving, via the graphical user interface while displaying the report in the graphical user interface, a selection of a cell in the table, the cell associated with a data dimension and with the context of the first report section;

receiving, via the graphical user interface while displaying the report in the graphical user interface, a request to associate the cell with a first input parameter of the software service;

associating the cell with the first input parameter of the software service in response to the request, received via the graphical user interface while displaying the report in the graphical user interface, to associate the cell with the first input parameter of the software service;

receiving, via the graphical user interface while displaying the report in the graphical user interface, a request to associate the contextual element with a second input parameter of the software service; and associating the contextual element with the second input parameter of the software service in response to the request, received via the graphical user interface while displaying the report in the graphical user interface, to associate the contextual element with the second input parameter of the software service;

wherein the first submission control that is created in response to the request, received via the graphical user interface while displaying the report in the graphical user interface, to create the first submission control, comprises a first button located in the first report section of the report;

wherein selection of the first button located in the first report section of the report causes invocation of the software service and passage of first data of the report as input parameters to the software service; and wherein the first data includes: (i) data populating the cell in the table and (ii) the data that: (a) is displayed in the view at a location outside of the rows and the columns of the table and (b) populates the contextual element;

the method further comprising:

receiving, via the graphical user interface while displaying the report in the graphical user interface, a request to create a second submission control;

creating the second submission control in response to the request to create the second submission control;

wherein the second submission control comprises a second button located in the report;

wherein selection of the second button located in the report causes invocation of the software service and passage of second data of the report as the input parameters to the software service; and wherein the second data includes the first data and data not included in the first data;

the method further comprising:

receiving, via the graphical user interface while displaying the report in the graphical user interface, a request to create a third submission control; and creating the third submission control in response to the request to create the third submission control;

wherein the third submission control comprises a third button located in the report;

wherein selection of the third button located in the report causes invocation of the software service and passage of third data of the report as the input parameters to the software service; and wherein the third data includes: (i) the second data that includes the first data and the data not included in the first data and (ii) data not included in the second data.

8. A non-transitory computer-readable medium having stored thereon program code, the program code executable by a computer to:

display a report in a view in a graphical user interface, the report including a first report section displayed in the view in the graphical user interface, the first report section displayed in the view including: (i) a table having a plurality of rows and a plurality of columns and (ii) data that populates a contextual element, indicates a context of the first report section and is displayed in the view at a location outside of the rows and the columns of the table;

receive, via the graphical user interface while displaying the report in the graphical user interface, a request to create a first submission control;

create the first submission control in response to the request, received via the graphical user interface while displaying the report in the graphical user interface, to create the first submission control;

receive, via the graphical user interface while displaying the report in the graphical user interface, a request to associate the first submission control with a software service;

associate the first submission control with the software service in response to the request, received via the graphical user interface while displaying the report in the graphical user interface, to associate the first submission control with the software service;

receive, via the graphical user interface while displaying the report in the graphical user interface, a selection of a cell in the table, the cell associated with a data dimension and with the context of the first report section;

receive, via the graphical user interface while displaying the report in the graphical user interface, a request to associate the cell with a first input parameter of the software service;

associate the cell with the first input parameter of the software service in response to the request, received via the graphical user interface while displaying the report in the graphical user interface, to associate the cell with the first input parameter of the software service;

receive, via the graphical user interface while displaying the report in the graphical user interface, a request to associate the contextual element with a second input parameter of the software service distinct from the request to associate the cell with the first input parameter of the software service; and associate the contextual element with the second input parameter of the software service in response to the request, received via the graphical user interface while displaying the report in the graphical user interface, to associate the contextual element with the second input parameter of the software service;

wherein the first submission control that is created in response to the request, received via the graphical user interface while displaying the report in the graphical user interface, to create the first submission control, comprises a first button located in the first report section of the report;

wherein selection of the first button located in the first report section of the report causes invocation of the software service and passage of first data of the report as input parameters to the software service, the first data including: (i) data populating the cell in the table and (ii) the data that: (a) is displayed in the view at a location outside of the rows and the columns of the table and (b) populates the contextual element that was associated with the second input parameter of the software service in response to the request that was distinct from the request to associate the cell with the first input parameter of the software service and received via the graphical user interface while displaying the report in the graphical user interface;

wherein the report further includes a second report section displayed in the same view as the first report section; and wherein the program code to associate the cell with the first input parameter of the software service comprises program code executable to:

create a mapping of input parameters of the software service to data dimensions associated with report elements, and the program code further executable to:

receive, via the graphical user interface while displaying the report in the graphical user interface, a request to create a second submission control; and create the second submission control in response to the request to create the second submission control, wherein the second submission control comprises a second button located in the second report section of the report;

wherein selection of the second button located in the second report section of the report causes invocation of the software service and passage of second data of the report as the input parameters to the software service;

wherein the first data is based on the mapping and the context of the first report section, and wherein the second data is based on the mapping and a context of the second report section
the program code further executable to:
receive, via the graphical user interface while displaying the report in the graphical user interface, a request to create a third submission control; and
create the third submission control in response to the request to create the third submission control;
wherein the third submission control comprises a third button located in the report; and
wherein selection of the third button located in the report causes invocation of the software service and passage of the first data of the report and the second data of the report as the input parameters to the software service.

9. A medium according to claim 8, wherein the first report section is associated with a report specification, the program code further executable to:
associate the software service with the report specification.

10. A medium according to claim 9, the program code further executable to:
create a named instance of the software service, the named instance being associated with the report specification.

11. A medium according to claim 8,
wherein the cell is associated with one of a row, a column and a table, and wherein
the program code executable to associate the cell with the first input parameter of the software service comprises:
program code executable to:
associate the one of the row, the column and the table with the first input parameter of the software service.

12. A medium according to claim 8, wherein the software service comprises a Web Service.

13. A medium according to claim 12, wherein the software service comprises a write back service.

14. A non-transitory computer-readable medium having stored thereon program code, the program code executable by a computer to:
display a report in a view in a graphical user interface, the report including a first report section displayed in the view in the graphical user interface, the first report section displayed in the view including: (i) a table having a plurality of rows and a plurality of columns and (ii) data that populates a contextual element, indicates a context of the first report section and is displayed in the view at a location outside of the rows and the columns of the table;
receive, via the graphical user interface while displaying the report in the graphical user interface, a request to create a first submission control;
create the first submission control in response to the request, received via the graphical user interface while displaying the report in the graphical user interface, to create the first submission control;
receive, via the graphical user interface while displaying the report in the graphical user interface, a request to associate the first submission control with a software service;
associate the first submission control with the software service in response to the request, received via the graphical user interface while displaying the report in the graphical user interface, to associate the first submission control with the software service;
receive, via the graphical user interface while displaying the report in the graphical user interface, a selection of a cell in the table, the cell associated with a data dimension and with the context of the first report section;
receive, via the graphical user interface while displaying the report in the graphical user interface, a request to associate the cell with a first input parameter of the software service;
associate the cell with the first input parameter of the software service in response to the request, received via the graphical user interface while displaying the report in the graphical user interface, to associate the cell with the first input parameter of the software service;
receive, via the graphical user interface while displaying the report in the graphical user interface, a request to associate the contextual element with a second input parameter of the software service; and
associate the contextual element with the second input parameter of the software service in response to the request, received via the graphical user interface while displaying the report in the graphical user interface, to associate the contextual element with the second input parameter of the software service;
wherein the first submission control that is created in response to the request, received via the graphical user interface while displaying the report in the graphical user interface, to create the first submission control, comprises a first button located in the first report section of the report;
wherein selection of the first button located in the first report section of the report causes invocation of the software service and passage of first data of the report as input parameters to the software service; and
wherein the first data includes: (i) data populating the cell in the table and (ii) the data that: (a) is displayed in the view at a location outside of the rows and the columns of the table and (b) populates the contextual element;
the program code further executable by a computer to:
receive, via the graphical user interface while displaying the report in the graphical user interface, a request to create a second submission control;
create the second submission control in response to the request to create the second submission control;
wherein the second submission control comprises a second button located in the report;
wherein selection of the second button located in the report causes invocation of the software service and passage of second data of the report as the input parameters to the software service; and
wherein the second data includes the first data and data not included in the first data;
the program code further executable by a computer to:
receive, via the graphical user interface while displaying the report in the graphical user interface, a request to create a third submission control; and
create the third submission control in response to the request to create the third submission control;
wherein the third submission control comprises a third button located in the report;
wherein selection of the third button located in the report causes invocation of the software service and passage of third data of the report as the input parameters to the software service; and
wherein the third data includes: (i) the second data that includes the first data and the data not included in the first data and (ii) data not included in the second data.

15. Apparatus comprising:
a computer to:
display a report in a view in a graphical user interface, the report including a first report section displayed in the view in the graphical user interface, the first report section displayed in the view including: (i) a table having a plurality of rows and a plurality of columns and (ii) data that populates a contextual element, indicates a context of the first report section and is displayed in the view at a location outside of the rows and the columns of the table;

receive, via the graphical user interface while displaying the report in the graphical user interface, a request to create a first submission control;

create the first submission control in response to the request, received via the graphical user interface while displaying the report in the graphical user interface, to create the first submission control;

receive, via the graphical user interface while displaying the report in the graphical user interface, a request to associate the first submission control with a software service;

associate the first submission control with the software service in response to the request, received via the graphical user interface while displaying the report in the graphical user interface, to associate the first submission control with the software service;

receive, via the graphical user interface while displaying the report in the graphical user interface, a selection of a cell in the table, the cell associated with a data dimension and with the context of the first report section;

receive, via the graphical user interface while displaying the report in the graphical user interface, a request to associate the cell with a first input parameter of the software service;

associate the cell with the first input parameter of the software service in response to the request, received via the graphical user interface while displaying the report in the graphical user interface, to associate the cell with the first input parameter of the software service;

receive, via the graphical user interface while displaying the report in the graphical user interface, a request to associate the contextual element with a second input parameter of the software service distinct from the request to associate the cell with the first input parameter of the software service; and associate the contextual element with the second input parameter of the software service in response to the request, received via the graphical user interface while displaying the report in the graphical user interface, to associate the contextual element with the second input parameter of the software service;

wherein the first submission control that is created in response to the request, received via the graphical user interface while displaying the report in the graphical user interface, to create the first submission control, comprises a first button located in the first report section of the report;

wherein selection of the first button located in the first report section of the report causes invocation of the software service and passage of first data of the report as input parameters to the software service, the first data including: (i) data populating the cell in the table and (ii) the data that: (a) is displayed in the view at a location outside of the rows and the columns of the table and (b) populates the contextual element that was associated with the second input parameter of the software service in response to the request that was distinct from the request to associate the cell with the first input parameter of the software service and received via the graphical user interface while displaying the report in the graphical user interface, and wherein the report further includes a second report section displayed in the same view as the first report section;

the computer further to:

create a mapping of input parameters of the software service to data dimensions associated with report elements;

receive, via the graphical user interface while displaying the report in the graphical user interface, a request to create a second submission control; and create the second submission control in response to the request to create the second submission control, wherein the second submission comprises a second button located in the second report section of the report;

wherein selection of the second button located in the second report section of the report causes invocation of the software service and passage of second data of the report as the input parameters to the software service;

wherein the first data is based on the mapping and the context of the first report section, and wherein the second data is based on the mapping and a context of the second report section;

the computer further to:

receive, via the graphical user interface while displaying the report in the graphical user interface, a request to create a third submission control; and create the third submission control in response to the request to create the third submission control;

wherein the third submission control comprises a third button located in the report; and wherein selection of the third button located in the report causes invocation of the software service and passage of the first data of the report and the second data of the report as the input parameters to the software service.

16. Apparatus comprising:

a computer to:

display a report in a view in a graphical user interface, the report including a first report section displayed in the view in the graphical user interface, the first report section displayed in the view including: (i) a table having a plurality of rows and a plurality of columns and (ii) data that populates a contextual element, indicates a context of the first report section and is displayed in the view at a location outside of the rows and the columns of the table;

receive, via the graphical user interface while displaying the report in the graphical user interface, a request to create a first submission control;

create the first submission control in response to the request, received via the graphical user interface while displaying the report in the graphical user interface, to create the first submission control;

receive, via the graphical user interface while displaying the report in the graphical user interface, a request to associate the first submission control with a software associate the first submission control with the software service in response to the request, received via the graphical user interface while displaying the report in the graphical user interface, to associate the first submission control with the software receive, via the graphical user interface while displaying the report in the graphical user interface, a selection of a cell in the table, the cell associated with a data dimension and with the context of the first report section;

receive, via the graphical user interface while displaying the report in the graphical user interface, a request to associate the cell with a first input parameter of the software service;

associate the cell with the first input parameter of the software service in response to the request, received via the graphical user interface while displaying the report in the graphical user interface, to associate the cell with the first input parameter of the software service;

receive, via the graphical user interface while displaying the report in the graphical user interface, a request to associate the contextual element with a second input parameter of the software service; and associate the contextual element with the second input parameter of the software service in response to the request, received via the graphical user interface while displaying the report in the graphical user interface, to associate the contextual element with the second input parameter of the software service;

wherein the first submission control that is created in response to the request, received via the graphical user interface while displaying the report in the graphical user interface, to create the first submission control, comprises a first button located in the first report section of the report;

wherein selection of the first button located in the first report section of the report causes invocation of the software service and passage of first data of the report as input parameters to the software service; and wherein the first data includes: (i) data populating the cell in the table and (ii) the data that: (a) is displayed in the view at a location outside of the rows and the columns of the table and (b) populates the contextual element;

the computer further to:
receive, via the graphical user interface while displaying the report in the graphical user interface, a request to create a second submission control;

create the second submission control in response to the request to create the second submission control;

wherein the second submission control comprises a second button located in the report;

wherein selection of the second button located in the report causes invocation of the software service and passage of second data of the report as the input parameters to the software service; and wherein the second data includes the first data and data not included in the first data;

the computer further to:
receive, via the graphical user interface while displaying the report in the graphical user interface, a request to create a third submission control; and create the third submission control in response to the request to create the third submission control;

wherein the third submission control comprises a third button located in the report;

wherein selection of the third button located in the report causes invocation of the software service and passage of third data of the report as the input parameters to the software service; and wherein the third data includes: (i) the second data that includes the first data and the data not included in the first data and (ii) data not included in the second data.

* * * * *